US006403207B1

(12) United States Patent
Weder

(10) Patent No.: US 6,403,207 B1
(45) Date of Patent: *Jun. 11, 2002

(54) PREFORMED POT COVER HAVING A PAPER-LIKE APPEARANCE

(75) Inventor: Donald E. Weder, Highland, IL (US)

(73) Assignee: Southpac Trust International, Inc., Rarotonga Cook Island ( * ) Notice: Subject to any disclaimer, the term of this patent is extended or adjusted under 35 U.S.C. 154(b) by 0 days.

This patent is subject to a terminal disclaimer.

(21) Appl. No.: 09/262,401

(22) Filed: Mar. 4, 1999

Related U.S. Application Data

(63) Continuation-in-part of application No. 09/098,898, filed on Jun. 17, 1998
(60) Provisional application No. 60/050,867, filed on Jun. 26, 1997.

(51) Int. Cl.[7] .................................................. A01G 9/02
(52) U.S. Cl. ..................... 428/221; 47/72; 229/87.18; 229/87.19; 428/35.9; 428/36.5; 428/36.6; 428/317.3; 428/319.3
(58) Field of Search ................ 428/221, 35.9, 428/36.5, 36.6, 317.3, 319.3; 229/87.18, 87.19; 47/72

(56) References Cited

U.S. PATENT DOCUMENTS

| | | | |
|---|---|---|---|
| 4,201,818 A | * | 5/1980 | Rohn .......................... 428/159 |
| 5,640,805 A | * | 6/1997 | Weder ............................ 47/72 |
| 5,811,493 A | * | 9/1998 | Kent ........................... 521/138 |

* cited by examiner

Primary Examiner—Nasser Ahmad
(74) Attorney, Agent, or Firm—Dunlap, Codding & Rogers, P.C.

(57) ABSTRACT

A substantially flexible, shape-sustaining article, such as a flower pot cover, is disclosed wherein the article has a paper-like appearance. The article can be made by forming a flexible, substantially non-shape sustaining polymeric material or a laminated material wherein at least one surface of the material is modified to provide the material with a paper-like texture or appearance. The substantially flexible, shape-sustaining article, which has an appearance of being made of paper, includes a base having a closed lower end, an open upper end with an object opening extending therethrough and a decorative border extending outwardly from the open upper end of the base. The base of the article has a plurality of overlapping folds of which at least a portion are permanently connected so that the article may be substantially flattened and then unflattened to assume the original shape of the article.

40 Claims, 10 Drawing Sheets

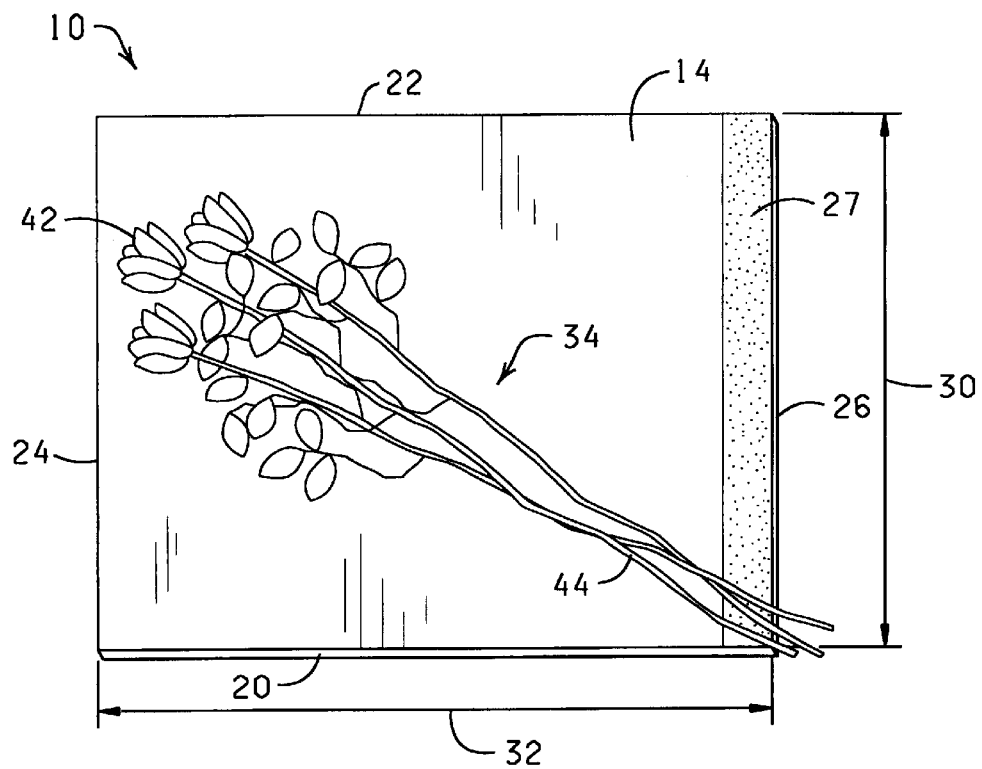
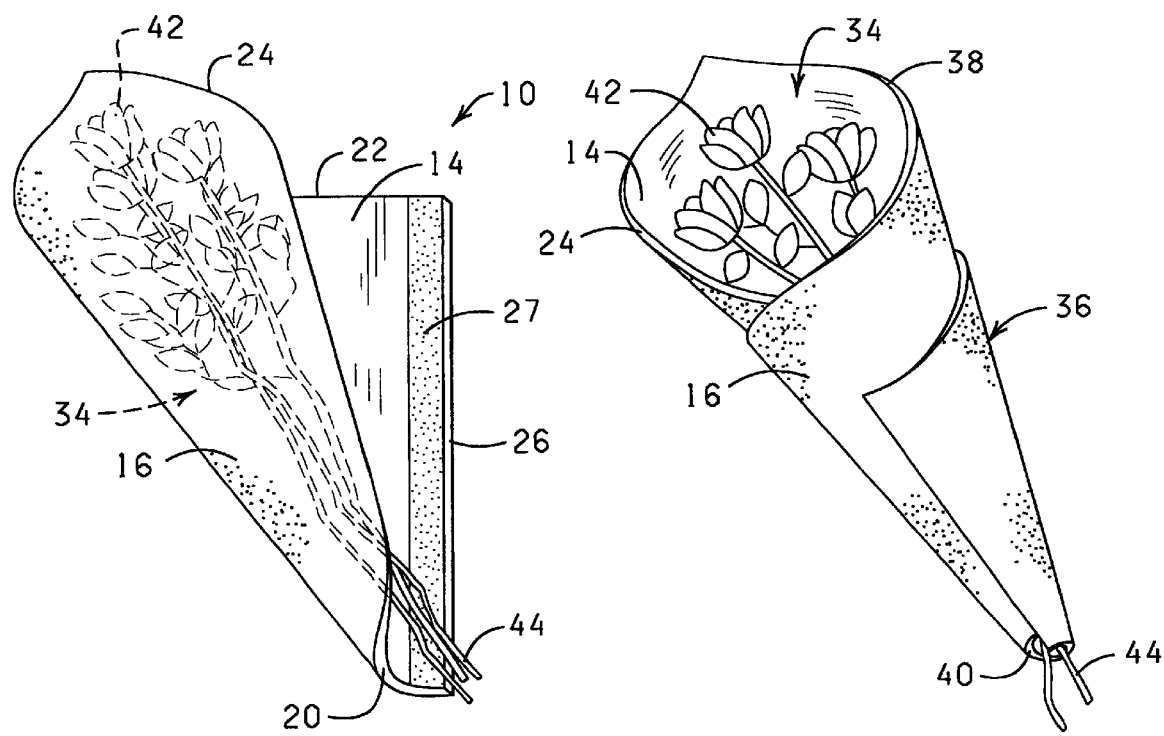

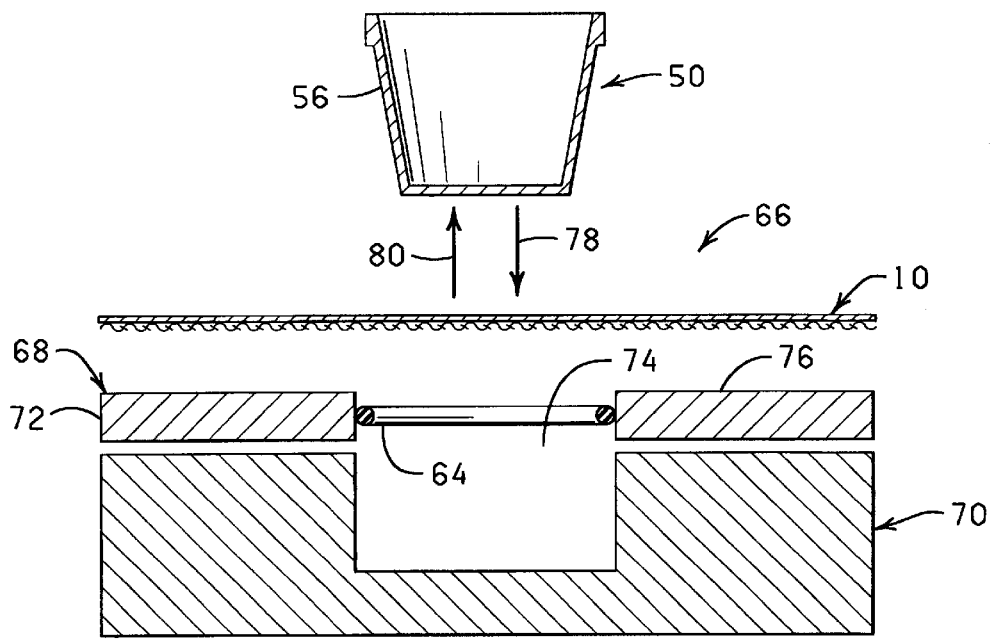
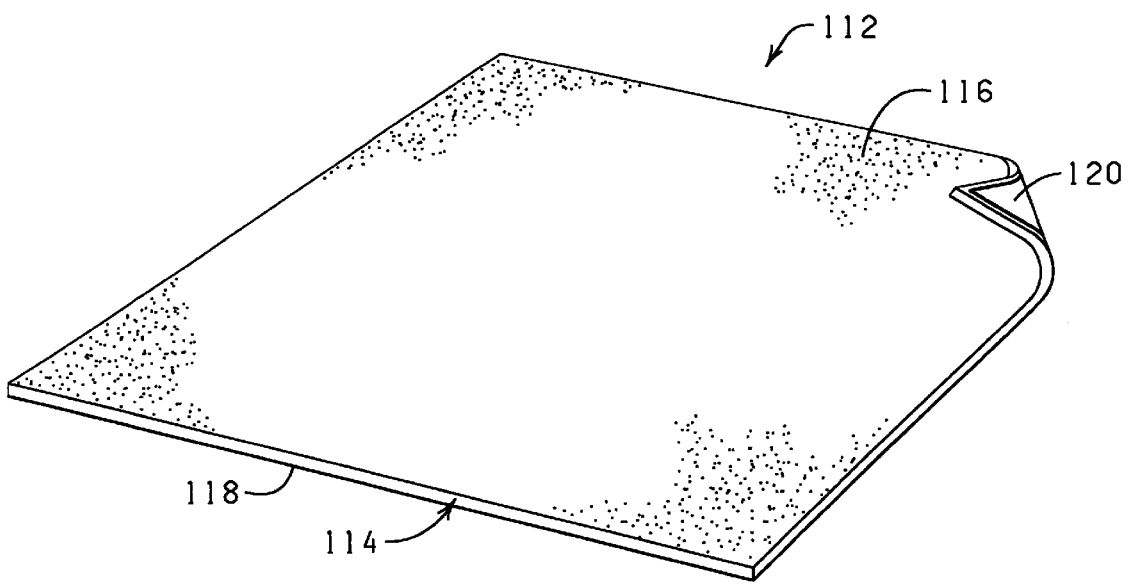
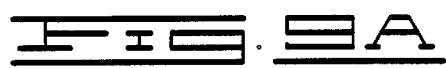

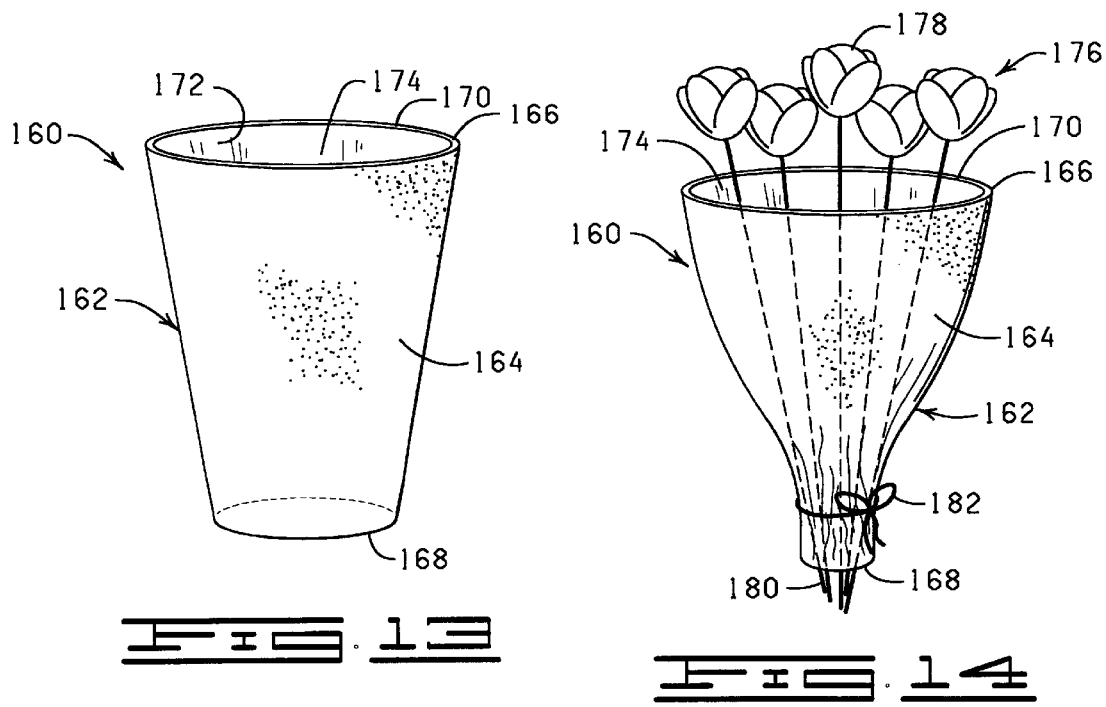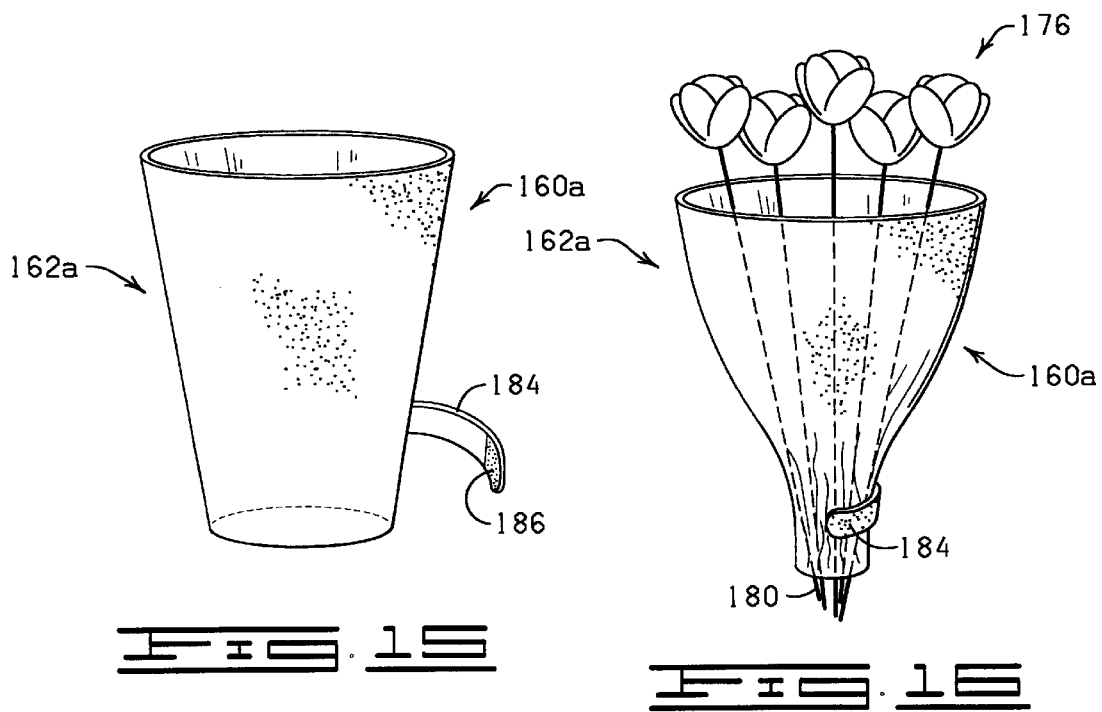

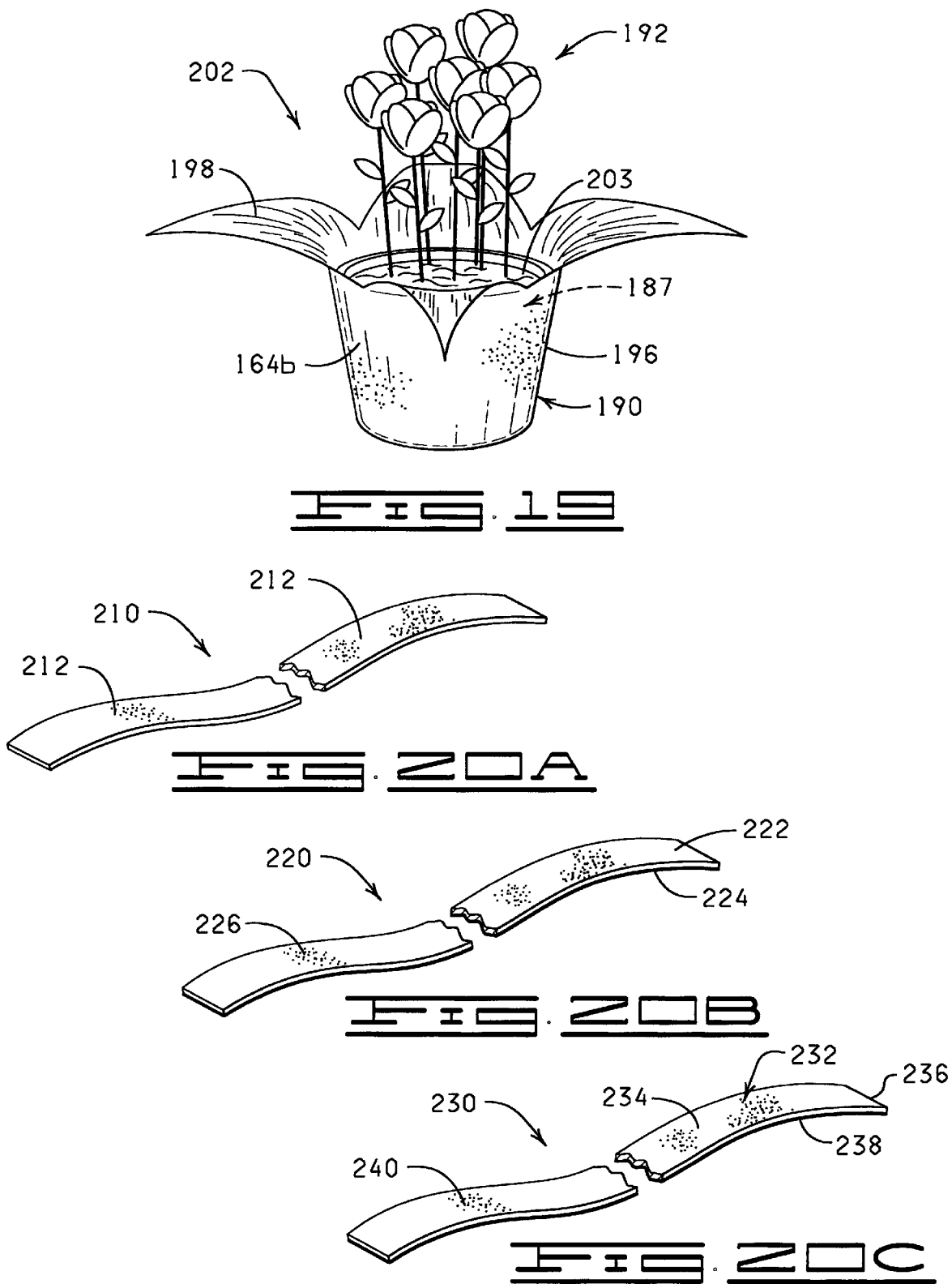

PREFORMED POT COVER HAVING A PAPER-LIKE APPEARANCE

CROSS REFERENCE TO RELATED APPLICATIONS

This application is a continuation-in-part application of copending application U.S. Ser. No. 09/098,898, filed Jun. 17, 1998, entitled "POLYMERIC MATERIAL HAVING A PAPER-LIKE APPEARANCE"; which claims the benefit of provisional application U.S. Ser. No. 60/050,867, filed Jun. 26, 1997, entitled "POLYMERIC MATERIAL HAVING A PAPER-LIKE APPEARANCE", now abandoned.

STATEMENT REGARDING FEDERALLY SPONSORED RESEARCH OR DEVELOPMENT

Not applicable.

FIELD OF THE INVENTION

The present invention relates to polymeric materials having a paper-like appearance, and more particularly but not by way of limitation, to flower pot covers, floral wrappings, ribbon materials and decorative grasses made from such polymeric materials. In one aspect, the present invention relates to methods for producing flower pot covers and methods of wrapping floral groupings and flower pots with a sheet of polymeric material having a paper-like appearance to provide a decorative cover for such floral groupings and flower pots. In yet another aspect, the present invention relates to methods of producing ribbon materials and decorative grasses having a paper-like appearance or texture.

BRIEF DESCRIPTION OF THE DRAWINGS

FIG. 3 is a perspective view of the sheet of polymeric material having a paper-like appearance of FIG. 2 having a floral grouping disposed thereon.

FIG. 4 is a perspective view of the floral grouping of FIG. 3 being wrapped with the sheet of polymeric material having a paper-like appearance of FIG. 2 by one method of wrapping.

FIG. 5 is a perspective view of a decorative cover for the floral grouping formed from the sheet of polymeric material of FIG. 2 wherein the decorative cover formed from the sheet of polymeric material has a conical configuration.

FIG. 8 is a cross-sectional view of a flower pot cover former and band applicator apparatus wherein the sheet of polymeric material having a paper-like appearance of FIG. 1 is disposed above an opening of the flower pot cover former and band applicator and wherein a flower pot is disposed above the sheet of polymeric material having a paper-like appearance.

FIG. 9A is a perspective view of a sheet of expanded core polymeric film having a paper-like appearance wherein an acrylic heat sealable lacquer is disposed on at least one surface thereof.

FIG. 13 is a perspective view of a floral sleeve formed from the sheet of polymeric material having a paper-like appearance.

FIG. 14 is a perspective view of the floral sleeve of FIG. 13 disposed about a floral grouping.

FIG. 15 is a perspective view of a floral sleeve having a clinching member wherein the floral sleeve is formed from a sheet of polymeric material having a paper-like appearance.

FIG. 16 is a perspective view of the floral sleeve of FIG. 15 disposed about a floral grouping.

FIG. 19 is a perspective view of a flower pot disposed in the sleeve of FIG. 17 wherein an upper portion of the sleeve has been removed to provide a decorative cover having a skirt.

FIG. 20A is a perspective view of a polymeric ribbon material having a paper-like appearance.

FIG. 20B is a perspective view of a polymeric ribbon material having a paper-like appearance formed of an expanded core polymeric film.

FIG. 20C is a perspective view of a laminated polymeric ribbon wherein at least one surface of the laminated polymeric ribbon is modified or textured to provide the laminated polymeric ribbon with an appearance assimilating the appearance of paper.

DETAILED DESCRIPTION

Description of FIGS. 1–9

Figure 1:
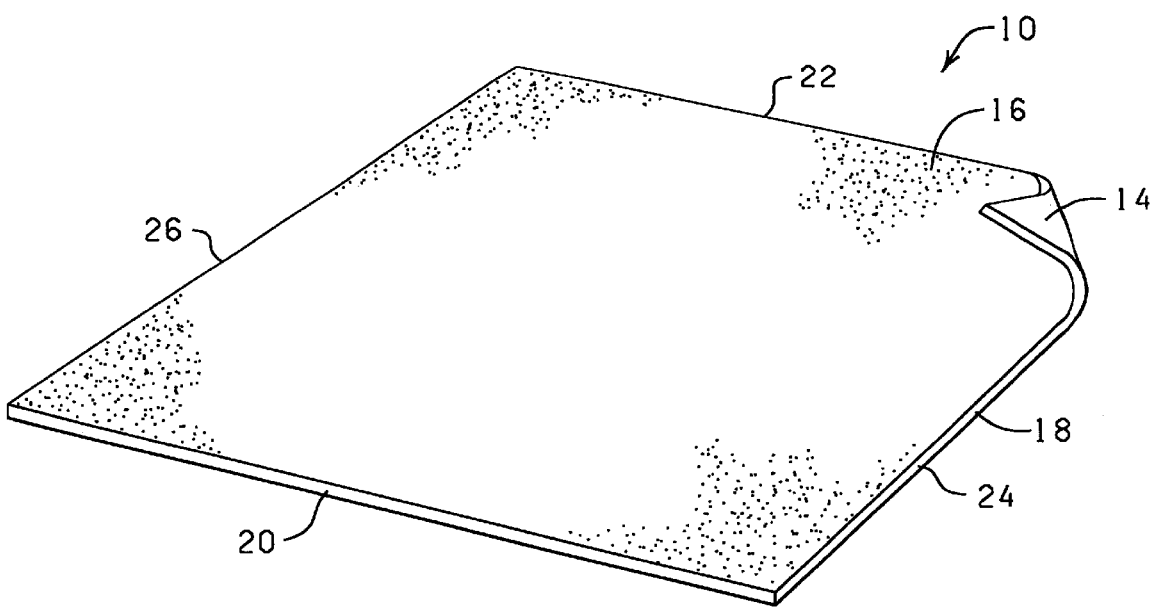
FIG. 1 is a perspective view of a sheet of polymeric material having a paper-like appearance constructed in accordance with the present invention.
Figure 2:
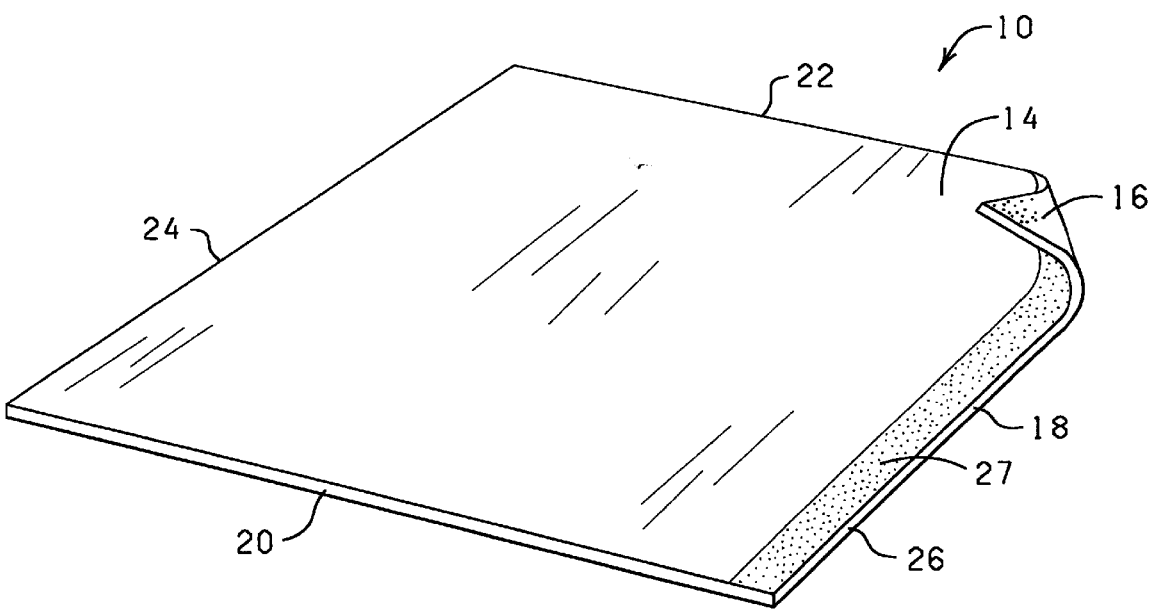
FIG. 2 is a perspective view of the sheet of polymeric material having a paper-like appearance of FIG. 1 having a bonding material disposed along one edge thereof.

Referring now to FIGS. 1 and 2, designated generally by the reference numeral 10 is a sheet or web of polymeric material having a texture or appearance simulating the texture or appearance of paper (hereinafter referred to as the sheet of polymeric material 10 or the sheet of polymeric material 10 having a paper-like appearance). That is, at least one surface of the sheet of polymeric material 10 has been modified to provide a matte or textured finish assimilating the texture and appearance of paper. The term "paper-like finish or appearance" may be used interchangeably with the terms "texture or appearance simulating the texture or appearance of paper" or "matte or textured finish assimilating the texture and appearance of paper."

The modification of the sheet of polymeric material 10 to provide the sheet of polymeric material 10 with a matte or textured finish assimilating the texture or appearance of paper can be accomplished in several ways. For example, a matte finish can be provided by printing a desired pattern on the sheet of polymeric material 10 and thereafter laminating a matte material, such as a translucent polymeric film, over the printed pattern. To further enhance the paper-like appearance of the sheet of polymeric material 10, the matte material may or may not have a plurality of spatially disposed holes extending therethrough. A matte or textured finish can also be produced by printing the sheet of polymeric material 10 with a matted (i.e. dull finish) ink, by lacquering at least one surface of the sheet of polymeric material 10 with a dull finish lacquer or a matting lacquer, by embossing the sheet of polymeric material 10 to provide an embossed pattern simulating the appearance or texture of paper, or by embossing and printing the sheet of polymeric material 10 to provide embossed and printed patterns wherein the embossed and printed patterns may be in registry, out of registry or wherein a portion of the embossed and printed patterns are in registry and a portion of the embossed and printed patterns are out of registry. In addition, a matte or textured finish capable of providing the sheet of polymeric material 10 with a paper-like appearance can be achieved by extruding a polymeric resin onto a matted or textured chill roll or by laminating a second sheet of material to the sheet of polymeric material 10.

The sheet of polymeric material 10 having a paper-like appearance has an upper surface 14, a lower surface 16, and an outer peripheral edge 18. At least one surface of the sheet of polymeric material 10, such as the lower surface 16, is matted or textured as described above to provide the sheet of polymeric material 10 with a paper-like appearance. The outer peripheral edge 18 of the sheet of polymeric material 10 comprises a first side 20, a second side 22, a third side 24, and a fourth side 26. A bonding material 27 (FIG. 2) may be disposed on at least a portion of one or both of the upper and lower surfaces 14 and 16 of the sheet of polymeric material 10, such as the upper surface 14 thereof as shown in FIG. 2 and as further illustrated in U.S. Pat. No. 5,181,364, the specification of which is hereby expressly incorporated herein by reference.

Figure 21:
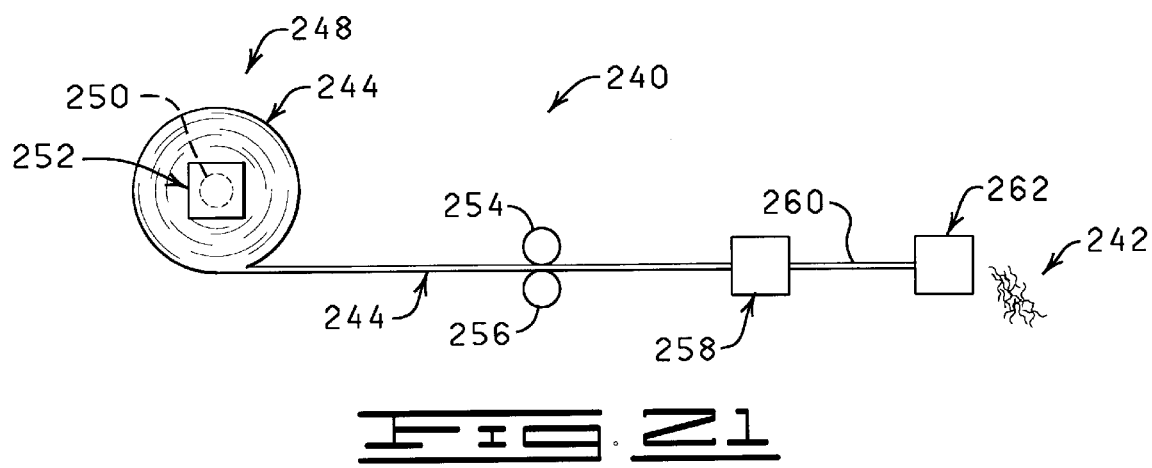
FIG. 21 is a schematic representation of a system for making decorative grass having a paper-like appearance or texture in accordance with the present invention.
Figure 22A:
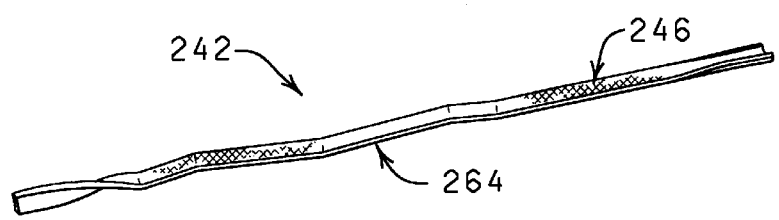
FIG. 22A is a perspective view of a segment of decorative grass having a paper-like appearance produced from the polymeric material having a paper-like appearance.
Figure 22B:
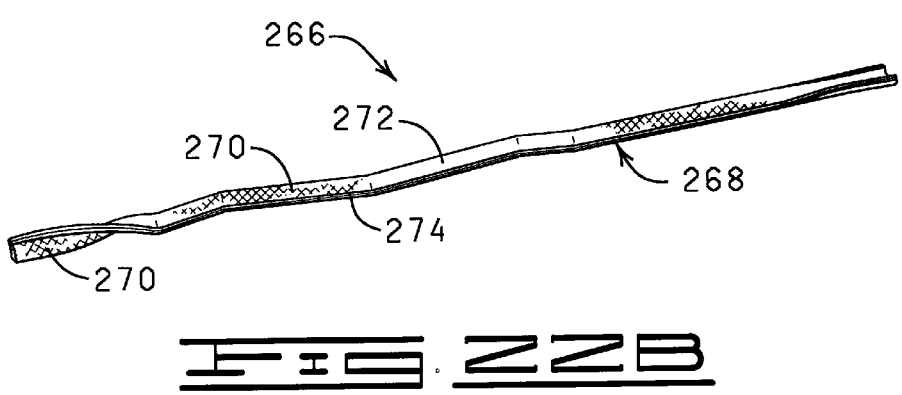
FIG. 22B is a perspective view of a segment of decorative grass having a paper-like appearance produced from a laminated polymeric material having a paper-like appearance.

The sheet of polymeric material 10 having a paper-like appearance may be employed to provide a decorative cover for a floral grouping (FIGS. 3 through 6) or a decorative cover for a flower pot (FIG. 7); or to form a preformed flower pot cover for covering a flower pot (FIGS. 10 and 11); or to provide a sleeve for wrapping or covering a floral grouping (FIGS. 13 through 16) or a flower pot (FIGS. 17 through 19); or to provide a ribbon material having a paper-like appearance (FIGS. 20A through 20C); or to produce decorative grass (FIGS. 21, 22A and 22B). The use of the sheet of polymeric material 10 having a paper-like appearance to form a decorative cover for a floral grouping or a flower pot, or to form a sleeve for a floral grouping or a flower pot, or to form a preformed flower pot cover, or as a ribbon material or to produce decorative grasses will be described in more complete detail herein.

As noted above, the sheet of polymeric material 10 having a paper-like appearance can be utilized to form a decorative cover for a floral grouping or a flower pot. The term "flower pot" as used herein refers to any type of container for holding a floral grouping, or a plant, or even another pot-type container. Examples of flower pots and/or pot-type containers include, but are not limited to, clay pots, wooden pots, plastic pots, pots made from natural and/or synthetic fibers, or any combination thereof. Such flower pots and/or pot-type containers are provided with a retaining space for receiving a floral grouping. The floral grouping may be disposed within the retaining space of the flower pot with a suitable growing medium described in further detail below, or other retaining medium, such as a floral foam. It will also be understood that in some cases the floral grouping, and any appropriate growing medium or other retaining medium, may be disposed in a sleeve formed from the sheet of polymeric material 10 if the sleeve is adapted to contain a medium.

"Floral grouping" as used herein means cut fresh flowers, artificial flowers, a single flower or other fresh and/or artificial plants or other floral materials and may include other secondary plants and/or ornamentation or artificial or natural materials which add to the aesthetics of the overall floral grouping. Further, the floral grouping may comprise a growing potted plant having a root portion as well. However, it will be appreciated that the floral grouping may consist of only a single bloom or only foliage, or a botanical item (not shown), or a propagule. The term "floral grouping" may be used interchangeably herein with the term "floral arrangement". The term "floral grouping" may also be used interchangeably herein with the terms "botanical item" and/or "propagule."

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "botanical item" when used herein means a natural or artificial herbaceous or woody plant, taken singularly or in combination. The term "botanical item" also means any portion or portions of natural or artificial herbaceous or woody plants including stems, leaves, flowers, blossoms, buds, blooms, cones, or roots, taken singularly or in combination, or in groupings of such portions such as bouquets or floral groupings.

The term "propagule" when used herein means any structure capable of being propagated or acting as an agent of reproduction including seeds, shoots, stems, runners, tubers, plants, leaves, roots or spores.

In the embodiments shown in the drawings, the sheet of polymeric material 10 having a paper-like appearance is square. It will be appreciated, however, that the sheet of polymeric material 10 having a paper-like appearance can be of any shape, configuration or size as long as the sheet of polymeric material 10 is sufficiently sized and shaped to wrap and encompass a floral grouping or a flower pot. For example, the sheet of polymeric material 10 may have a rectangular, round, oval, octagonal or asymmetrical shape. Further, multiple sheets of the polymeric material 10 may be used in a single circumstance to provide a decorative cover or sleeve for a floral grouping or a flower pot. Moreover, when multiple sheets of the polymeric material 10 having a paper-like appearance are used in combination, the sheets of polymeric material 10 need not be uniform in size or shape. Finally, it will be appreciated that the sheet of polymeric material 10 having a paper-like appearance shown herein is a substantially flat sheet except for the texturing, matting, embossing, flocking, application of a foamable lacquer or foamable ink, or other treatments and techniques employed to provide the sheet of polymeric material 10 with the desired texture or matting so that the sheet of polymeric material 10 has the appearance of paper.

Any thickness or stiffness of the sheet of polymeric material 10 may be utilized in accordance with the present invention as long as the sheet of polymeric material 10 can be modified to provide the sheet of polymeric material 10 with a paper-like appearance and the sheet of polymeric material 10 having a paper-like appearance can be wrapped about at least a portion of a floral grouping or a flower pot or to form a preformed flower pot cover, or to form a sleeve, or to provide ribbon material, or to produce decorative grasses, as described herein. Generally, the sheet of polymeric material 10 will have a thickness of from about 0.1 mil to about 30 mil, and more desirably a thickness of from about 0.5 mil to about 10 mil.

The terms "polymer film", "polymeric film" and "polymeric material" when used herein means a synthetic polymer such as a polypropylene or polyethylene, a naturally occurring polymer such as cellophane, an extruded polymeric material having an expanded core such as extruded polypropylene having an expanded core and combinations thereof. The extruded polymeric material having an expanded core may also be referred to herein as an expanded core polymeric material.

"Extruded polymeric material having an expanded core" or "expanded core polymeric film" as used herein means any extrudable polymeric material or polymeric film in which the core is expanded during extrusion, such as by incorporation of a blowing agent in the polymeric resin which is being extruded.

The sheet of polymeric material 10 may also be constructed, in whole or in part, from a cling material. "Cling material" when used herein means any material which is capable of connecting to the sheet of material and/or itself upon contacting engagement during the wrapping process and is wrappable about an item whereby portions of the cling material contactingly engage and connect to other portions of another material, or, alternatively, itself, for generally securing the material wrapped about at least a portion of a flower pot. This connecting engagement is preferably temporary in that the material may be easily removed, i.e., the cling material "clings" to the flower pot.

The cling material is constructed from polyethylene such as Cling Wrap made by Glad®, First Brands Corporation, Danbury, Conn. and may be treated if necessary. The thickness of the cling material will, in part, depend upon the size of sleeve and the size of the flower pot in the sleeve, i.e., generally, a larger flower pot may require a thicker and therefore stronger cling material. The cling material will range in thickness from about 0.1 mil to about 10 mil, and more desirably from about 0.5 mil to about 2.5 mil. However, any thickness of cling material may be utilized in accordance with the present invention which permits the cling material to be modified as hereinbefore described to provide the cling material with a paper-like appearance.

Figure 9B:
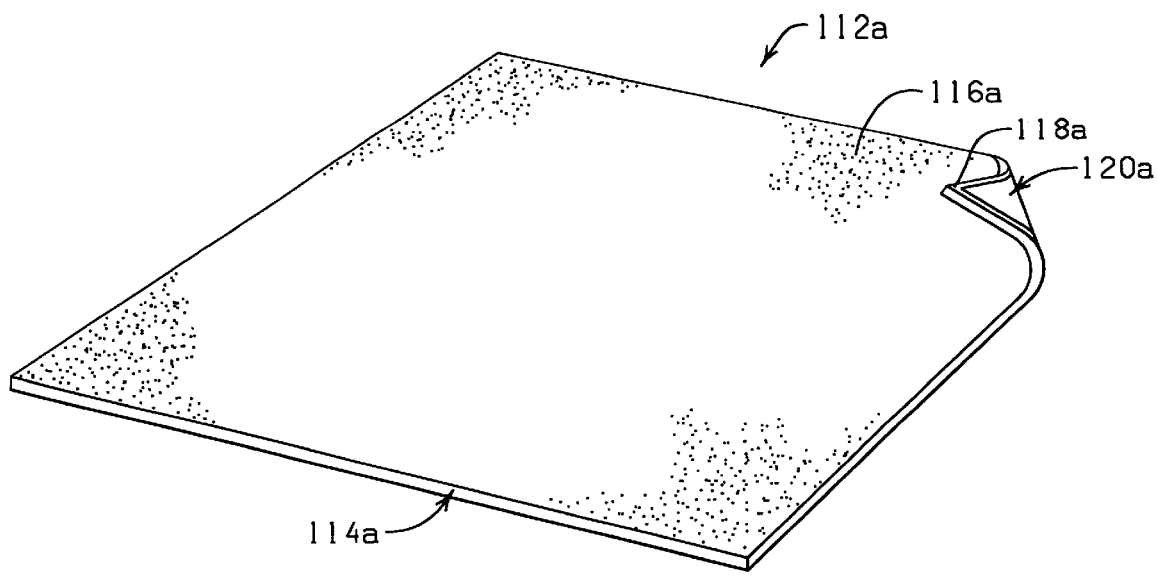
FIG. 9B is a perspective view of a laminated sheet of material wherein one surface is modified or textured to provide the sheet of laminated material with a paper-like appearance.

A decorative cover for a floral grouping (FIGS. 3 through 6), or a decorative cover for a flower pot (FIG. 7), or a preformed flower pot cover for covering a flower pot (FIGS. 10 and 11), or a sleeve for wrapping or covering a floral grouping (FIGS. 13 through 16) or a flower pot (FIGS. 17 through 19), or a ribbon material having a paper-like appearance (FIGS. 20A–20C), or decorative grass (FIGS. 21, 22A and 22B) may also be constructed of a laminated material having a texture or appearance simulating paper in texture or appearance (as shown in FIG. 9B and described in more detail hereinafter). The laminated material having a paper-like appearance can be produced by laminating two or more sheets of polymeric film (such as two or more sheets of polypropylene film or a sheet of polypropylene film and a sheet of expanded core polymeric film, such as expanded core polypropylene film), or by laminating a polymeric film (such as polypropylene film or an expanded core polymeric film) to metallized foil and the like wherein at least one surface of the laminated material is textured or modified to assimilate the appearance or texture of paper. The only requirements in using a laminated material having a paper-like appearance to form a decorative cover for a floral grouping, or a decorative cover for a flower pot, or a preformed flower pot cover for covering a flower pot, or a sleeve for wrapping or covering a floral grouping or a flower pot, or as ribbon material or decorative grass in accordance with the present invention is that at least one surface of the laminated material be capable of being modified to provide the laminated material with at least one surface having a paper-like appearance and that the laminated material be sufficiently flexible or pliable to permit the laminated material to be formed into a decorative cover for a floral grouping, or a decorative cover for a flower pot, or a preformed flower pot cover for covering a flower pot, or a sleeve for wrapping or covering a floral grouping or a flower pot, or to be used as ribbon material or decorative grass. It should also be noted that two or more separate sheets of material can be used to form a decorative cover for a floral grouping, or a decorative cover for a flower pot, or a preformed flower pot cover for covering a flower pot, or a sleeve for wrapping or covering a floral grouping or a flower pot as long as one of the sheets of material is modified or textured to provide same with a paper-like appearance.

The sheet of polymeric material 10 or a laminated material (FIG. 9B) having a paper-like appearance may vary in color. Further, the sheet of polymeric material 10 or a laminated material may be provided with other decorative patterns or designs in addition to the matting, texturing, flocking, application of foamable lacquers or foamable inks, or embossing employed to impart the paper-like appearance to the sheet of polymeric material 10 or the laminated material.

As illustrated in FIG. 3, the sheet of polymeric material 10 has a width 30 extending generally between the first side 20 and the second side 22, respectively, sufficiently sized whereby the sheet of polymeric material 10 can be wrapped about and encompass a floral grouping or a flower pot. The sheet of polymeric material 10 has a length 32 extending generally between the third side 24 and the fourth side 26, respectively, sufficiently sized whereby the sheet of polymeric material 10 extends over a substantial portion of the floral grouping when the sheet of polymeric material 10 has been wrapped about the floral grouping in accordance with the present invention, as described in detail herein. The sheet of polymeric material 10 may also be wrapped about a flower pot to substantially wrap and cover the flower pot in accordance with the present invention.

A plurality of sheets of polymeric material 10 having a paper-like appearance may be connected together to form a roll as is shown in U.S. Pat. No. 5,459,976, issued to Weder et al. on Oct. 24, 1995, entitled "MATERIAL AND ADHESIVE STRIP DISPENSER", the specification of which is hereby expressly incorporated in its entirety herein by reference.

FIGS. 3–5 illustrate the use of the sheet of polymeric material 10 having a paper-like appearance in wrapping a floral grouping 34 to provide a decorative cover 36 (FIG. 5) for the floral grouping 34 wherein the decorative cover 36 has an open upper end 38 and a lower end 40. The sheet of polymeric material 10 may optionally have a strip of bonding material disposed upon the upper surface 14, the lower surface 16 or both, such as the strip of bonding material 27 disposed along at least a portion of the upper surface 14 of the sheet of polymeric material 10 so as to be disposed substantially adjacent the fourth side 26 thereof substantially as shown in FIGS. 3 and 4. Further, the sheet of polymeric material 10 having a paper-like appearance can be provided either as an individual sheet or from a pad or roll of material.

The bonding material 27, if present, may have a backing or release strip (not shown). The backing or release strip may be left applied for a period of time to the bonding material 27 after it is disposed on a surface of the sheet of polymeric material 10 prior to its use as a wrapping material to protect the bonding qualities of the strip of bonding material 27.

In operation, an operator may dispose the sheet of polymeric material 10 having a paper-like appearance on a support surface (not shown); the lower surface 16 of the sheet of polymeric material 10 (which has been modified to provide the sheet of polymeric material 10 with a paper-like appearance), contacting the support surface.

Referring more specifically to FIGS. 3–5, the floral grouping 34 is placed upon the upper surface 14 of the sheet of polymeric material 10 in a diagonal orientation. The floral grouping 34 has an upper bloom or foliage portion 42 and a lower stem portion 44. The sheet of polymeric material 10 is then wrapped about the floral grouping 34 by the operator (FIGS. 4 and 5), the operator overlapping a portion of the sheet of polymeric material 10 over another portion of the sheet of polymeric material 10. That is, for example, the operator places the first side 20 of the sheet of polymeric material 10 over the floral grouping 34, as shown in FIG. 4. The operator continues to roll the floral grouping 34 and the sheet of polymeric material 10 in the direction toward the second side 22 of the sheet of polymeric material 10 until the upper surface 14 adjacent the fourth side 26 firmly engages the lower surface 16 of the sheet of polymeric material 10, wherein the floral grouping 34 is substantially encompassed by the sheet of polymeric material 10, and wherein the bonding material 27 on the upper surface 14 of the sheet of polymeric material 10 contacts the lower surface 16 of the sheet of polymeric material 10 to provide the decorative cover 36 having a paper-like appearance on at least a portion of one surface thereof which substantially encompasses and surrounds a substantial portion of the floral grouping 34.

FIG. 5 shows the floral grouping 34 wrapped in a conical fashion to provide the decorative cover 36 for the floral grouping 34 which has the appearance of being made of paper. When the floral grouping 34 is wrapped in a conical fashion, the bloom portion 42 of the floral grouping 34 is exposed near the open upper end 38 of the decorative cover 36, and the stem portion 44 of the floral grouping 34 is exposed near the lower end 40 of the decorative cover 36.

Figure 6:
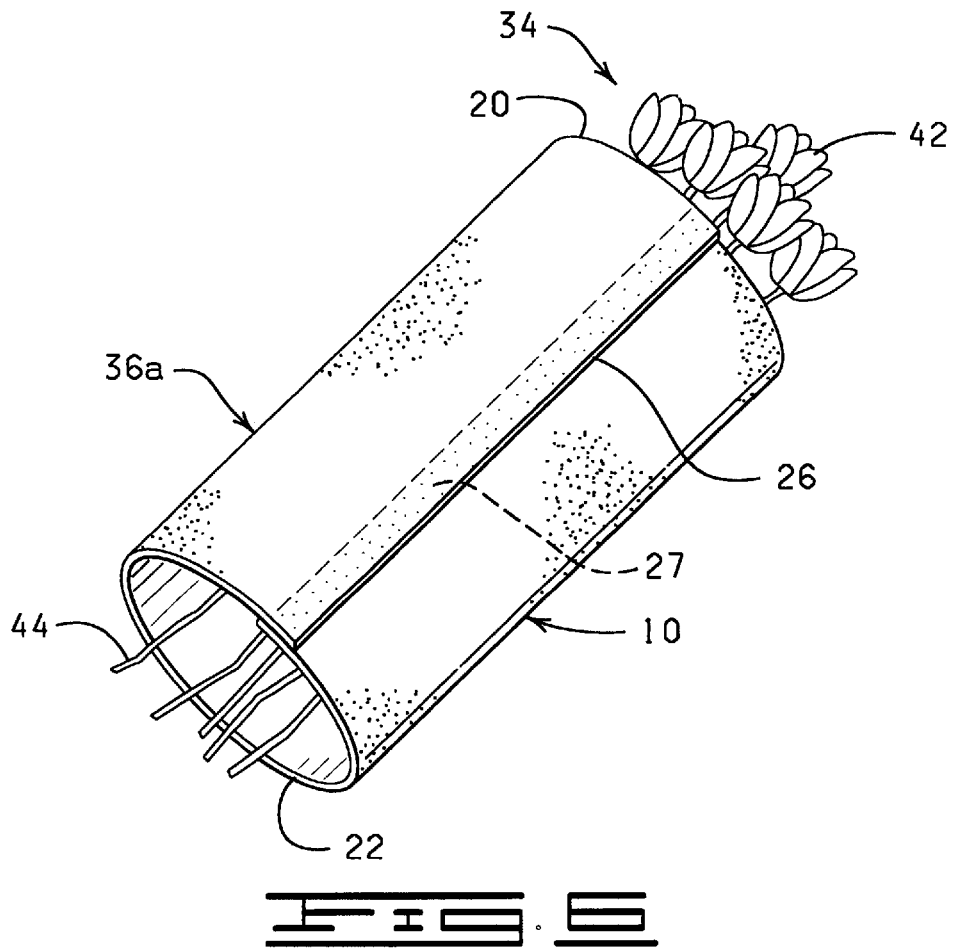
FIG. 6 is a perspective view of a decorative cover for the floral grouping formed from the sheet of polymeric material of FIG. 2 wherein the decorative cover has a substantially cylindrical configuration.

In another embodiment, illustrated in FIG. 6, the sheet of polymeric material 10 having a paper-like appearance is utilized to wrap the floral grouping 34 in a cylindrical fashion. The floral grouping 34 is disposed upon the sheet of polymeric material 10 approximately parallel to the third side 24 of the sheet of polymeric material 10. The sheet of polymeric material 10 is wrapped generally about the stem portion 44 of the floral grouping 34 to a position wherein the fourth side 26 of the sheet of polymeric material 10 generally overlaps the third side 24 of the sheet of polymeric material 10 in a cylindrical fashion. It should be noted that the sheet of polymeric material 10 may be wrapped a plurality of times about the stem portion 44 of the floral grouping 34 before the overlapping of the third side 24 and the fourth side 26 of the sheet of polymeric material 10. As before, the portion of the sheet of polymeric material 10 near the fourth side 26 is disposed generally adjacent another portion of the sheet of polymeric material 10 and the two adjacent portions then are brought into contact where they may be bondingly engaged, thereby securing the sheet of polymeric material 10 generally about the floral grouping 34 so as to provide a decorative cover 36a for the floral grouping 34 which has the appearance of being fabricated of paper.

Figure 7:
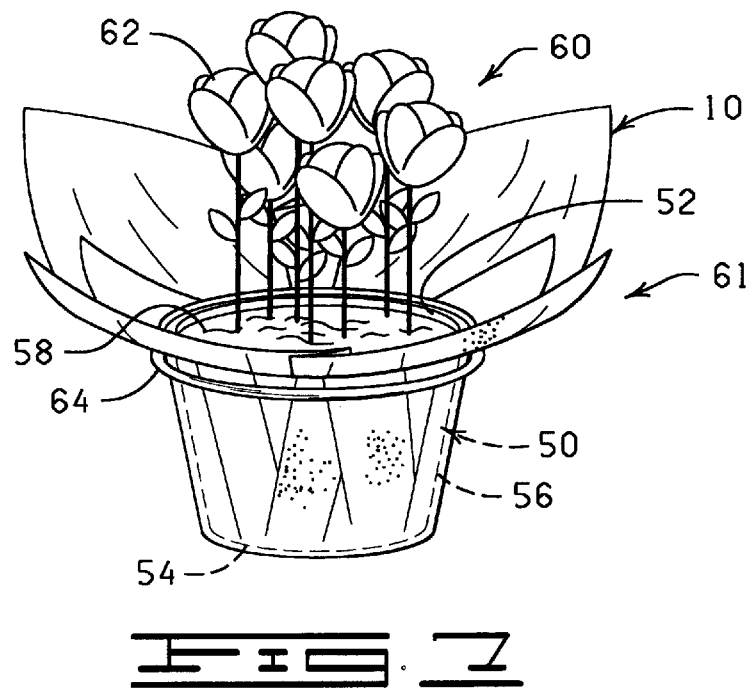
FIG. 7 is a perspective view of a decorative cover positioned about a flower pot wherein the decorative cover is formed from the sheet of polymeric material having a paper-like appearance of FIG. 1.

In another version of the invention, the sheet of polymeric material 10 having a paper-like appearance may be used to wrap a flower pot or pot-type container, as noted above. Shown in FIG. 7 is a flower pot designated by the reference numeral 50 having an open upper end 52, a bottom end 54, an outer peripheral surface 56, and an inner retaining space 58 within which may be disposed a growing medium. The flower pot 50 may contain a botanical item, such as a plant 60, which has an upper portion 62 comprising blooms or foliage or both.

The sheet of polymeric material 10 having a paper-like appearance may be wrapped about the flower pot 50 by any one of numerous methods used to wrap sheets of material about flower pots to form decorative pot covers for flower pots, such as a decorative cover 61 having a paper-like appearance disposed about the flower pot 50 illustrated in FIG. 7. The sheet of polymeric material 10 may, for example, be formed by hand about the outer peripheral surface 56 of the flower pot 50 to produce the decorative cover 61 which has the appearance of being fabricated of paper. The decorative cover 61 can then be secured about the flower pot 50 by a bonding material or by an elastic band 64 such that the open upper end 52 of the flower pot 50 remains substantially uncovered by the decorative cover 61 substantially as shown in FIG. 7.

Referring now to FIG. 8, a flower pot cover former and band applicator device 66 for forming the sheet of polymeric material 10 having a paper-like appearance into the decorative cover 61 for the flower pot 50 of FIG. 7 is illustrated. The flower pot cover former and band applicator device 66 comprises a band applicator 68 and a flower pot cover former 70. The flower pot cover former and band applicator device 66 has a support platform 72 with an opening 74 formed therein. A band, such as the elastic band 64, is disposed circumferentially about the opening 74 in the support platform 72.

The lower surface 16 of the sheet of polymeric material 10 (which has been modified to provide the sheet of polymeric material 10 with a textured or matted surface assimilating paper in appearance) is positioned on an upper surface 76 on the support platform 72 such that the sheet of polymeric material 10 is positioned over the opening 74 in the support platform 72. The flower pot 50 is positioned above the sheet of polymeric material 10 and is moved in a direction 78 into the opening 74 of the flower pot cover former and band applicator device 66. As the flower pot 50 is moved into the opening 74, the sheet of polymeric material 10 is pressed about the outer peripheral surface 56 of the flower pot 50 thereby forming the decorative cover 61 about the flower pot 50. The decorative cover 61 (which has a paper-like appearance) is then secured about the flower pot 50 by the elastic band 64. The flower pot 50 having the decorative cover 61 secured thereto is then moved in a direction 80 out of the opening 74 in the support platform 72.

The elastic band 64 can be applied manually or automatically, such as by the method shown in U.S. Pat. No. 5,105,599 issued to Weder et al. on Apr. 21, 1992, which is hereby expressly incorporated herein by reference. The band 64 can also be applied as a tie using a method such as is described in "Single Station Covering and Fastening System", U.S. Pat. No. 5,609,009, issued to Weder et al. on Mar. 11, 1997, the specification of which is hereby expressly incorporated herein by reference. The sheet of polymeric material 10 having a paper-like appearance can also be applied automatically about the flower pot 50, for example, by methods shown in U.S. Pat. Nos. 4,733,521 and 5,291,721, both of which are hereby expressly incorporated herein by reference.

Instead of securing the decorative cover 61 about the flower pot 50 via the elastic band 64, the decorative cover 61 formed from the sheet of polymeric material 10 having a paper-like appearance may be secured to the flower pot 50 by the use of one or more bonding materials. For example, the upper surface 14 of the sheet of polymeric material 10 may have a bonding material such as the bonding material 27 disposed upon a portion thereof. When the sheet of polymeric material 10 is disposed about the flower pot 50, at least a portion of the upper surface 14 of the sheet of polymeric material 10 contacts the outer peripheral surface 56 of the flower pot 50 and is thereby bonded and held about the flower pot 50 via the bonding material 27.

The bonding material 27 may cover a portion of the upper surface 14 of the sheet of polymeric material 10, or the bonding material 27 may entirely cover the upper surface 14 of the sheet of polymeric material 10. The bonding material 27 may be disposed on the upper surface 14 of the sheet of polymeric material 10 in the form of a strip or in the form of spaced-apart spots. One method for disposing the bonding material 27 on the sheet of polymeric material 10 is described in U.S. Pat. No. 5,111,637, entitled "Method For Wrapping A Floral Grouping", issued to Weder, et al. on May 12, 1992, which is expressly incorporated herein by reference.

The term "bonding material" when used herein can mean an adhesive, frequently a pressure sensitive adhesive, or a cohesive or any adhesive/cohesive combination having adhesive qualities (i.e., qualities of adhesion or adhesion/cohesion, respectively) sufficient to cause the attachment of a portion of the sheet of polymeric material 10 to itself, to the floral grouping 34, or to the flower pot 50. Since the bonding material 27 may be either an adhesive, a cohesive, or an adhesive/cohesive combination, it will be appreciated that both adhesives and cohesives are known in the art, and both are commercially available. When the bonding material 27 is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" also includes materials which are sonically sealable and vibratory sealable. The term "bonding material" when used herein also means a heat sealing lacquer or hot melt material which may be applied to the material and, in this instance, heat, sound waves, or vibrations, also must be applied to effect the sealing.

The term "bonding material" when used herein also means any type of material or thing which can be used to effect the bonding or connecting of the two adjacent portions of the sheet of polymeric material 10 to effect the connection or bonding described herein. The term "bonding material" may also include ties, labels, bands, ribbons, strings, tapes (including single or double-sided adhesive tapes), staples or combinations thereof. Some of the bonding materials would secure the ends of the material while other bonding materials may bind the circumference of a cover, or a sleeve, or, alternatively and/or in addition, the bonding materials would secure overlapping folds in the material and/or sleeve. Another way to secure the sheet of polymeric material 10 about the floral grouping 34 or the flower pot 50 is to heat seal the ends of the material to another portion of the material. One way to do this is to contact the ends with an iron of sufficient heat to heat seal the material.

Alternatively, a cold seal adhesive may be utilized as the bonding material 27. The cold seal adhesive adheres only to a similar substrate, acting similarly as a cohesive, and binds only to itself. The cold seal adhesive, since it bonds only to a similar substrate, does not cause a residue to build up on equipment, thereby both permitting much more rapid disposition and use of such equipment to form articles and reducing labor costs. Further, since no heat is required to effect the seal, the dwell time, that is, the time for the sheet of material to form and retain the shape of an article, such as a flower pot cover or flower pot, is reduced. A cold seal adhesive binds quickly and easily with minimal pressure, and such a seal is not readily releasable. This characteristic is different from, for example, a pressure sensitive adhesive.

The term "bonding material" when used herein also means any heat or chemically shrinkable material, and static electrical or other electrical material, chemical welding material, magnetic material, mechanical or barb-type fastening material or clamps, curl-type characteristics of the film or materials incorporated in material which can cause the material to take on certain shapes, cling films, slots, grooves, shrinkable materials and bands, curl materials, springs, and any type of welding method which may weld portions of the material to itself or to the pot, or to both the material itself and the pot.

Description of FIGS. 9–12

Figure 10:
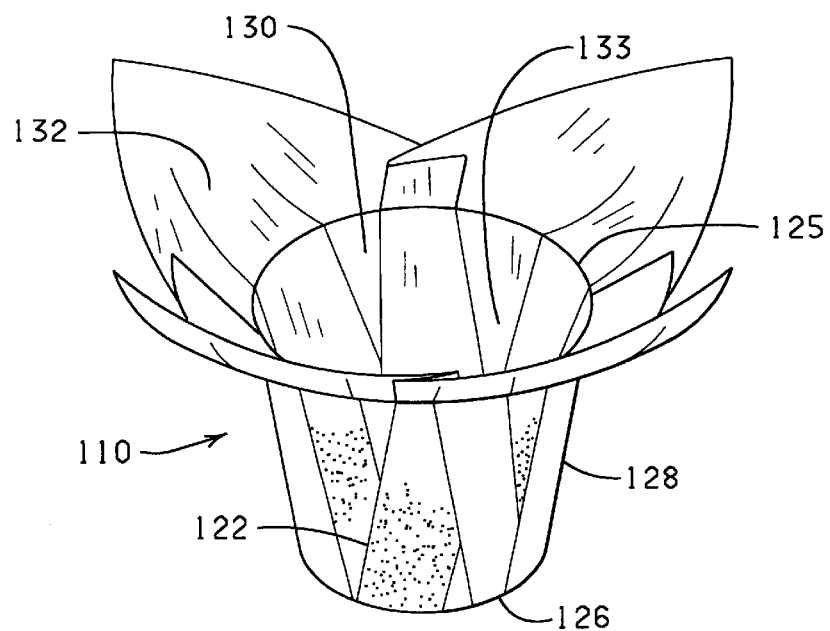
FIG. 10 is a perspective view of a decorative preformed flower pot cover formed from a sheet of polymeric material having a paper-like appearance similar to the sheet of polymeric material of FIG. 1, the sheet of expanded core polymeric film of FIG. 9A, or the laminated sheet of material of FIG. 9B.
Figure 11:
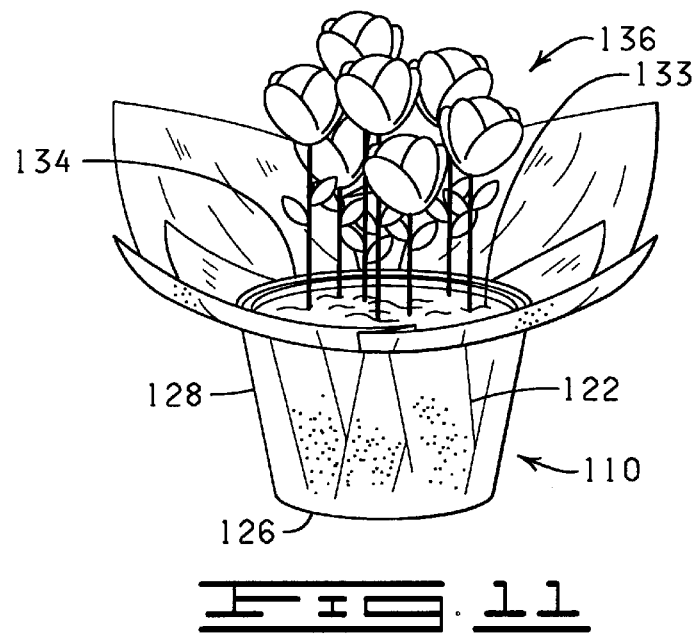
FIG. 11 is a perspective view of the preformed pot cover of FIG. 10 having a flower pot disposed therein.

Referring now to FIGS. 10 and 11, a decorative preformed flower pot cover 110 is illustrated constructed from a sheet of flexible material 112 having a paper-like appearance (FIG. 9A) or a flexible laminated sheet of material 112a having a paper-like appearance (FIG. 9B). In the embodiment shown in FIG. 9A, the sheet of flexible material 112 used in the construction of the decorative preformed flower pot cover 110 comprises a sheet of expanded core polymeric material 114 having an upper surface 116, a lower surface 118 and a thickness in the range of from about 0.5 mil to about 10 mil, more desirably in the range of from about 0.6 mil to about 1.25 mil, and a coating of an acrylic heat sealable lacquer 120 disposed on at least one of the upper and lower surfaces 116 and 118, respectively, of the sheet of expanded core polymeric film 114. It should be understood, however, that the sheet of flexible material 112 is not limited to being the sheet of expanded core polymeric film 114 having a paper-like appearance; rather, the sheet of flexible material 112 can be any flexible polymeric material (such as the sheet of polymeric material 10 herein before described) or flexible laminated material (such as will be described herein after with reference to FIG. 9B) which can be modified or textured so that at least one surface of such polymeric material or laminated material is provided with a paper-like appearance and/or texture.

As previously stated, the modification of the sheet of expanded core polymeric film 114 to provide the sheet of flexible material 112 with the desired paper-like matte or textured finish can be accomplished by printing a desired pattern on the sheet of expanded core polymeric material 114 and thereafter laminating a matte material, such as a translucent polymeric film, over the printed pattern. To further enhance the paper-like appearance, the matte material may or may not have a plurality of spatially disposed holes extending therethrough. A matte or textured finish can also be produced by printing the sheet of expanded core polymeric material 114 with a matted (i.e. dull finish) ink, by lacquering at least one surface of the sheet of expanded core polymeric material 114 with a dull finish lacquer or a matting lacquer, by embossing the sheet of expanded core polymeric material 114 to provide an embossed pattern assimilating the texture and appearance of paper, or by embossing and printing the sheet of expanded core polymeric material 114 to provide embossed and printed patterns wherein the embossed and printed patterns may be in registry, out of registry, or wherein a portion of the embossed and printed patterns are in registry and a portion of the embossed and printed patterns are out of registry. In addition, a matte or textured finish capable of providing the sheet of flexible polymeric material 112 with a paper-like appearance can be achieved by extruding a polymeric resin onto a matted or textured chill roll to produce the sheet of expanded core polymeric material 114 or by laminating a second sheet of material to the sheet of expanded core polymeric material 114.

When the sheet of flexible material 112 is formed into the decorative preformed flower pot cover 110, a plurality of overlapping folds 122 are formed, and at least a portion of the overlapping folds 122 are permanently connected to adjacently disposed portions of the decorative preformed flower pot cover 110 via the acrylic heat sealable lacquer 120. A substantial portion of the overlapping folds 122 in the decorative preformed flower pot cover 110 extend over different distances and at various and arbitrary angles.

As shown in FIGS. 10 and 11, the decorative preformed flower pot cover 110 has a base 124 having an open upper end 125, a lower end 126, and an outer peripheral surface 128. An opening 130 intersects the open upper end 125 of the base 124 of the decorative preformed flower pot cover 110, forming an inner peripheral surface 132 which defines and encompasses a retaining space 133 within which a flower pot 134 containing a floral grouping 136 may be disposed in a manner well known in the art (FIG. 11). The decorative preformed flower pot cover 110 is further provided with a decorative border 138 which extends outwardly from the open upper end 125 of the base 124 of the decorative preformed flower pot cover 110.

In another embodiment, a sheet of flexible laminated material 112a (FIG. 9B) is used in the construction of the decorative preformed flower pot cover 110. The sheet of flexible laminated material 112a comprises a first sheet of material 114a having an upper surface 116a and a lower surface 118a, and a second sheet of material 120a. At least one surface of the first sheet of material 114a or the second sheet of material 120a is modified to provide the sheet of flexible laminated material 112a with the desired paper-like appearance. The sheet of flexible laminated material 112a having a paper-like appearance can be produced by laminating two or more sheets of polymeric film (such as two or more sheets of polypropylene film or a sheet of polypropylene film and a sheet of expanded core polymeric film, such as expanded core polypropylene film), or by laminating a polymeric film (such as polypropylene film or an expanded core polymeric film) with a sheet of metallized foil and the like wherein at least one surface of the sheet of flexible laminated material 112a is textured or modified to assimilate the appearance of paper. In addition to texturing or modifying at least one surface of the sheet of flexible laminated material 112a to provide same with an appearance assimilating the appearance of paper, at least one of the sheets of polymeric film or the sheet of metallized foil film may contain embossed and printed patterns, designs or materials; and the embossed and printed patterns, designs or materials may be in register with one another, out of register with one another, or a portion of the embossed and printed patterns may be in register with one another and a portion of the embossed and printed patterns may be out of register with one another.

The first sheet of material 114a desirably has a thickness of from about 0.5 mil to about 10 mil, and more desirably from about 0.6 mil to about 1.25 mil, and the second sheet of material 120a desirably has a thickness of from about 0.5 mil to about 10 mil, and more desirably from about 0.6 mil to about 1.25 mil. The second sheet of material 120a is desirably laminated to the first sheet of material 114a with a colored adhesive so as to impart a desired color to the laminated sheet of flexible material 112a. While the thickness of the sheet of flexible material 112a can vary widely and will generally depend on the thickness of the first sheet of material 114a and the thickness of the second sheet of material 120a, desirable results can be obtained where the laminated sheet of flexible material 112a has a thickness in the range of from about 1 mil to about 20 mil, and more desirably from about 1.2 mil to about 2.5 mil. Desirably, the first sheet of material 114a is an expandable core polymeric film and the second sheet of material 102a is a substantially water impervious polymeric film.

As previously stated, the decorative preformed flower pot cover 110 may be constructed from the sheet of polymeric material 10 (FIG. 1), or the sheet of flexible material 112 (FIG. 9A), or the sheet of flexible laminated material 112a (FIG. 9B). The decorative preformed flower pot cover 110 so formed will have a plurality of overlapping folds 122 formed therein, at least a portion thereof being permanently connected. If desired, the decorative preformed flower pot cover 110 can be formed of a plurality of sheets of the same and/or different types of material. The method and apparatus employed to form the decorative preformed flower pot cover 110 is substantially identical whether one uses one or more sheets of polymeric material 10 (FIG. 1), one or more sheets of flexible material 112 (FIG. 9A), or one or more sheets of flexible laminated material 112a (FIG. 9B) or a combination of such sheets of material. Thus, only the formation of the decorative preformed flower pot cover 110 using the sheet of flexible material 112 of FIG. 9 will be described in detail hereinafter.

Figure 12:
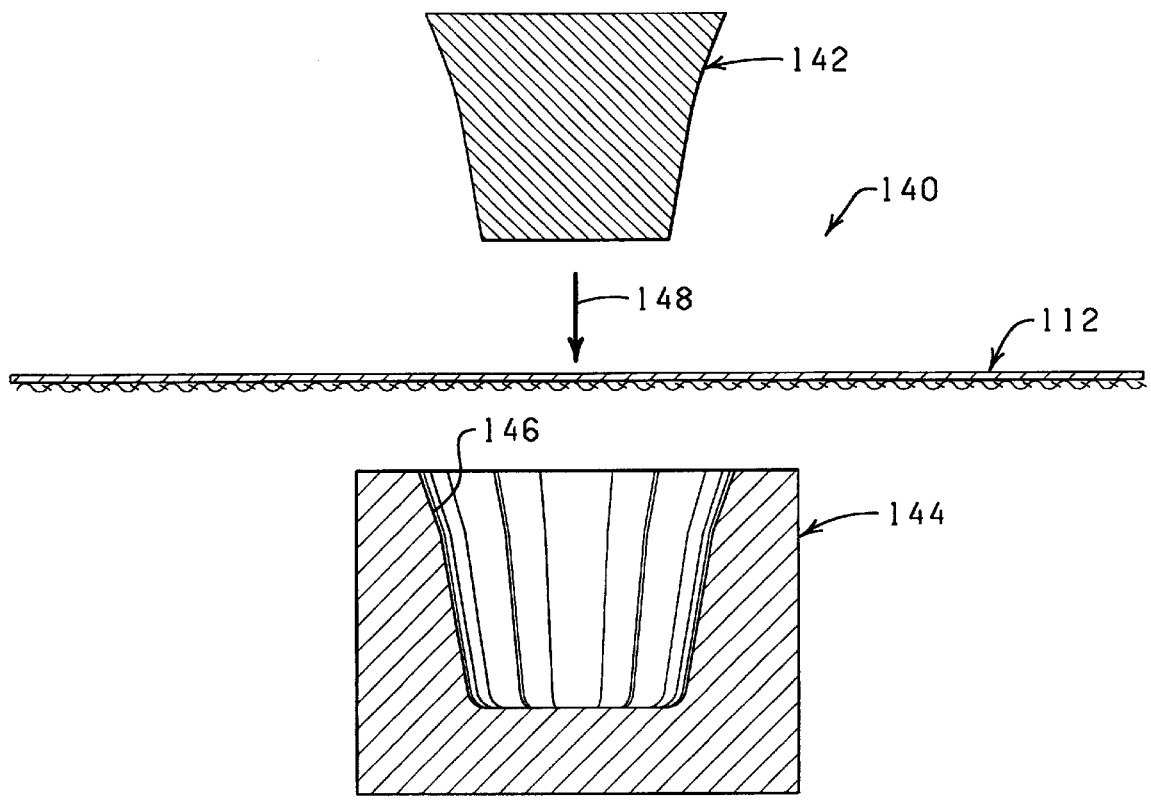
FIG. 12 is a diagrammatic, cross-sectional view of a male and female mold having the sheet of expanded core polymeric film of FIG. 9A disposed therebetween for forming the decorative preformed flower pot cover of FIG. 10.

The decorative preformed flower pot cover 110 may be formed using a conventional mold system 140 comprising a male mold 142 and a female mold 144 having a mold cavity 146 for matingly receiving the male mold 142 (FIG. 12). The sheet of flexible material 112 is positioned between the male and female molds 142 and 144, respectively. Movement of the male mold 142 in the direction 148 and into the mold cavity 146 forces the sheet of flexible material 112 to be disposed about the portion of the male mold 142 disposed in the mold cavity 146 of the female mold 144 and thereby forms the sheet of flexible material 112 into the preformed decorative flower pot cover 110 (FIGS. 10 and 11). Further, in accordance with the present invention, the decorative preformed flower pot cover 110 constructed from the materials described herein above may have a bonding material disposed upon a portion thereof.

Methods for forming such preformed decorative pot covers are well known in the art. Two methods of forming such covers are described in U.S. Pat. Nos. 4,773,182 and 5,291,721, each of which is expressly incorporated herein by reference.

Description of FIGS. 13–19

Shown in FIG. 13 is a decorative cover designated therein by the general reference numeral 160 which comprises a flexible bag or sleeve 162 of unitary construction having a paper-like appearance in accordance with the present invention. The sleeve 162 may be used as a decorative cover 160 for a floral grouping or a flower pot. The sleeve 162 initially comprises a flexible flat collapsed piece of material which is openable in the form of a tube or sleeve. Such sleeves are well known in the floral industry. Further, in accordance with the present invention, the decorative cover 160 can be constructed of the polymeric material 10 (FIG. 1), the flexible material 112 (FIG. 9A), or the flexible laminated material 112*a* (FIG. 9B), whereby at least a portion of one surface of the sleeve 162, preferably an outer peripheral surface 164 of the sleeve 162, has been modified to provide the sleeve 162 with a paper-like appearance as previously described herein. The sleeve 162 has an upper end 166, a lower end 168 and the outer peripheral surface 164. The sleeve 162 may be tapered outwardly from the lower end 168 toward a larger diameter at its upper end 166. In its flattened state the sleeve 162 generally has an overall trapezoidal or modified trapezoidal shape, and when opened is substantially frusto-conical in shape. It will be appreciated, however, that the sleeve 162 may have variations on the aforementioned shapes or may have significantly altered shapes such as square or rectangular, wherein the sleeve 162 when opened has a cylindrical form, as long as the sleeve 162 functions in accordance with the present invention in the manner described herein. The sleeve 162 (or any other sleeve disclosed herein) may have an angular or contoured shape.

The sleeve 162 has an opening 170 at the upper end 166 thereof and may be open at the lower end 168, or closed with a bottom at the lower end 168. The sleeve 162 also has an inner peripheral surface 172 which, when the sleeve 162 is opened, defines and encompasses an inner retaining space 174. When the lower end 168 of the sleeve 162 has a closed lower end 168, a portion of the lower end 168 may be inwardly folded to form one or more gussets (not shown) for allowing the lower portion of the inner retaining space 174 to be expandable, for example, for receiving the circular bottom of a pot or growing medium.

The sleeve 162 is generally frusto-conically shaped, but the sleeve 162 may be, by way of example but not by way of limitation, cylindrical, frusto-conical, a combination of both frusto-conical and cylindrical, or any other shape, as long as the sleeve 162 functions as described herein as noted above. Further, the sleeve 162 may comprise any shape, whether geometric, non-geometric, asymmetrical and/or fanciful as long as it functions in accordance with the present invention. The sleeve 162 may also be equipped with drain holes (if having a closed bottom) or side ventilation holes (not shown), or can be made from gas permeable or impermeable materials.

The material from which the sleeve 162 is constructed is the same as previously described above for the sheet of polymeric material 10 having a paper-like appearance, or the sheet of flexible material 112 or the sheet of laminated material 112*a*. Any thickness of material may be utilized in accordance with the present invention as long as the sleeve 162 may be formed as described herein, is provided with a paper-like appearance, and as long as the formed sleeve 162 may contain at least a portion of a flower pot or a floral grouping as described herein. Additionally, an insulating material such as bubble film, preferable as one of two or more layers, can be utilized in order to provide additional protection for the item, such as a floral grouping, contained therein.

In FIG. 14 the sleeve 162 is illustrated having a paper-like appearance provided on the outer peripheral surface 164 of the sleeve 162. A floral grouping 176 is disposed within the inner retaining space 174 of the sleeve 162. Generally, an upper or bloom portion 178 of the floral grouping 176 is exposed near the opening 170 of the sleeve 162 and a lower or stem portion 180 of the floral grouping 176 is exposed near the lower end 168 of the sleeve 162. Either end of the sleeve 162 may be closed about the floral grouping 176. Generally, a portion of the sleeve 162 is tightened about a portion of the stem portion 180 of the floral grouping 176 for holding the decorative cover 160 about the floral grouping 176. For example, the sleeve 162 may be held by a tie 182 tied about the sleeve 162, such as is shown in FIG. 14. Other methods for binding the sleeve 162 about the floral grouping 176 may be employed, such as the bonding materials described elsewhere herein. For example, as shown in FIG. 15, a decorative cover 160*a* is shown which comprises a sleeve 162*a* having a paper-like appearance and a clinching tab 184 having a bonding material 186 disposed upon a surface thereof. The clinching tab 184 can be used to gather portions of the sleeve 162*a* together about the stem portion 180 of the floral grouping 176 as shown in FIG. 16 for holding the sleeve 162*a* tightly about the floral grouping 176.

Similarly, it may generally be desired to use the sleeve 162 as a decorative cover for a flower pot (not shown). The flower pot will generally contain a botanical item or plant. The flower pot can be deposited into the open sleeve 162 in a manner well known in the art, such as manually wherein the sleeve 162 is opened by hand and the flower pot deposited therein.

As noted above, a bonding material may be disposed on a portion of the sleeve 162 or any sleeve described herein to assist in holding the sleeve 162 to the flower pot when the flower pot is disposed within the sleeve 162 or to assist in closing the upper end 166 of the sleeve 162 or adhering the sleeve 162 to the flower pot after the flower pot has been disposed therein, as will be discussed in further detail below.

It will be understood that the bonding material, if present, may be disposed as a strip or block on a surface of the sleeve 162. The bonding material may also be disposed upon either the outer peripheral surface 164 or the inner peripheral surface 172 of the sleeve 162, as well as upon the flower pot. Further, the bonding material may be disposed as spots of bonding material, or in any other geometric, non-geometric, asymmetric, or fanciful form, and in any pattern, including covering either the entire inner peripheral surface 172 and/or outer peripheral surface 164 of the sleeve 162 and/or the flower pot. The bonding material may be covered by a cover or release strip which can be removed prior to the use of the sleeve 162 or flower pot. The bonding material can be applied by methods known to those of ordinary skill in their art. One method for disposing a bonding material, in this case an adhesive, is described in U.S. Pat. No. 5,111,637, issued to Weder et al. on May 12, 1993, which is hereby incorporated herein by reference.

As noted above, a bonding material may be disposed on at least a portion of the inner peripheral surface 172 of the sleeve 162 (or any other sleeve described herein), or, alternatively, the bonding material may be disposed on the outer peripheral surface of a flower pot contained within the sleeve 162, while the sleeve 162 may be free of the bonding material. In a further alternative, the bonding material may be disposed both on at least a portion of the flower pot as well as upon at least a portion of the inner peripheral surface 172 of the sleeve 162. In addition, a portion of the bonding material may also be disposed on the outer peripheral surface 164 of the sleeve 162 as well. It will be understood that the bonding material may be disposed in a solid section of bonding material. The bonding material, when present, is disposed on the sleeve 162 and/or flower pot by any method known in the art.

Certain versions of sleeves described herein may be used in combination with a preformed pot cover. For example, a preformed pot cover may be applied to the pot, then the covered pot wrapped or disposed within a sleeve. Either the cover or the sleeve, or both, may have a paper-like appearance. Examples of sleeves which may be used in this invention are shown in the specification of U.S. Pat. No. 5,625,979, issued to Weder on May 6, 1997, the specification of which is expressly incorporated herein by reference in its entirety. Equipment and devices for forming sleeves are commercially available, and well known in the art.

Figure 17:
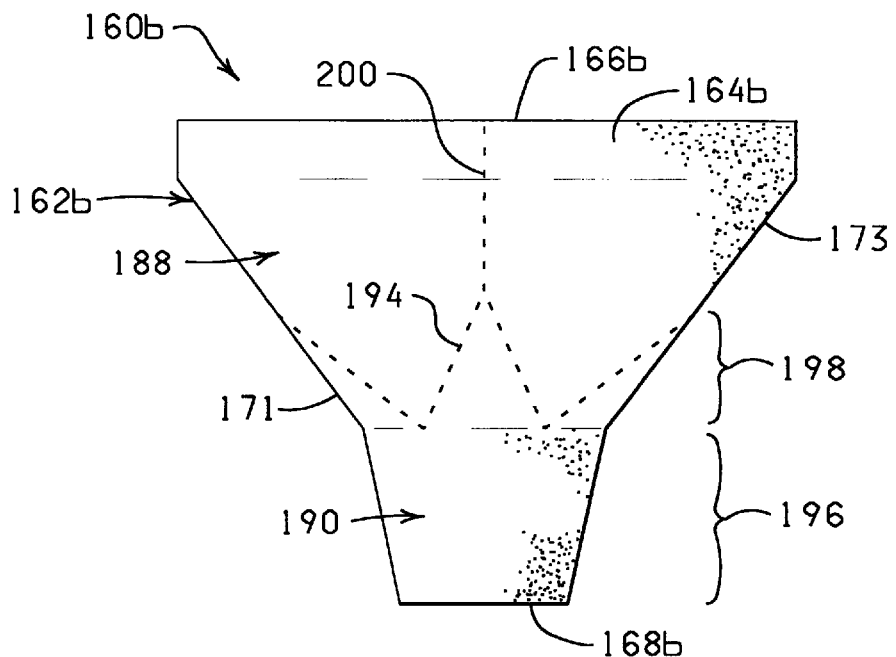
FIG. 17 is a side view of a sleeve having a detachable portion wherein the sleeve is formed from a sheet of polymeric material having a paper-like appearance.
Figure 18:
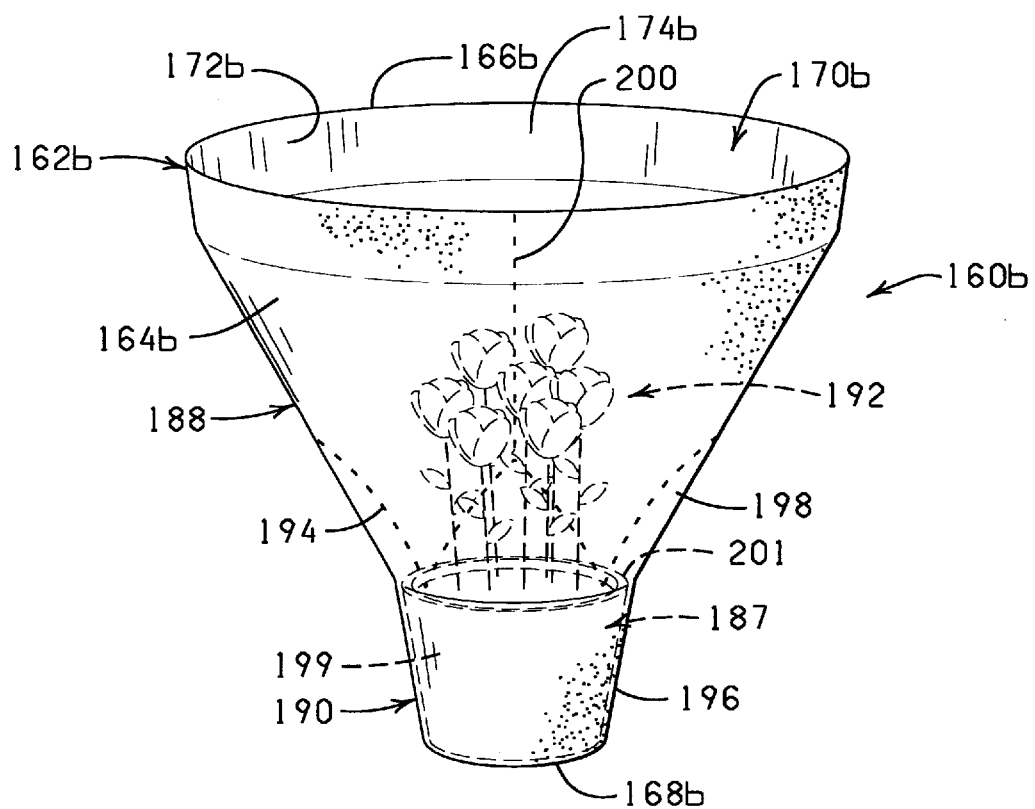
FIG. 18 is a perspective view of the sleeve of FIG. 17 having a flower pot disposed therein.

Shown in FIGS. 17 and 18 is another embodiment of a decorative cover 160b comprising a sleeve 162b having a paper-like appearance constructed from the polymeric material 10 having a paper-like appearance, or the flexible material 112 or the laminated material 112a in accordance with the present invention. The sleeve 162b has a "detaching" element in predetermined areas for detaching a portion of the sleeve 162b. The sleeve 162b generally initially comprises a flexible flat collapsed piece of material which is openable in the form of a tube or sleeve. The sleeve 162b is constructed of the same material and in the same way as the sleeve 162 described previously herein and may be described exactly the same as the other sleeves described herein except for the additional elements described hereinafter.

The sleeve 162b has an upper end 166b, a lower end 168b, and an outer peripheral surface 164b. The sleeve 162b has an opening 170b at the upper end 166b thereof, and the sleeve 162b may be open at the lower end 168b or closed with a bottom at the lower end 168b. In a flattened state, the sleeve 162b has a first side 171 and a second side 173. The sleeve 162b also has an inner peripheral surface 172b which, when the sleeve 162b is opened, defines and encompasses an inner retaining space 174b as shown in FIG. 18. When the lower end 168b of the sleeve 162b has a closed bottom, a portion of the lower end 168b may be inwardly folded to form one or more gussets (not shown) for permitting a circular bottom of an object such as a flower pot 187 to be disposed in the inner retaining space 174b of the sleeve 162b.

As shown in FIGS. 17 and 18, the sleeve 162b is demarcated into an upper portion 188 and a lower portion 190. The lower portion 190 of the sleeve 162b is generally sized to contain the flower pot 187. The upper portion 188 of the sleeve 162b is sized to substantially surround and encompass a plant 192 contained in the flower pot 187 disposed within the lower portion 190 of the sleeve 162b. The sleeve 162b is demarcated into the upper portion 188 and the lower portion 190 by a detaching element 194 for enabling the detachment of the upper portion 188 of the sleeve 162b from the lower portion 190 of the sleeve 162b. In the present version, the detaching element 194 is a plurality of generally laterally-oriented or alternating diagonally-oriented perforations or other non-linear configurations which extend circumferentially across the outer peripheral surface 164b of the sleeve 162b from the first side 171 to the second side 173.

In the embodiment shown in FIGS. 17 and 18, the lower portion 190 of the sleeve 162b further comprises a base portion 196 and a skirt portion 198. The base portion 196 of the lower portion 190 of the sleeve 162b is that part of the lower portion 190 which, when the flower pot 187 is placed into the lower portion 190, has an inner peripheral surface 172b which surrounds an outer peripheral surface 199 of the flower pot 187. The skirt portion 198 of the lower portion 190 of the sleeve 162b is that part of the lower portion 190 which extends beyond an open upper end 201 of the flower pot 187 and substantially adjacent about at least a portion of the plant 192 contained within the flower pot 187 and which is left to freely extend at an angle, inwardly or outwardly, from the base portion 196 when the upper portion 188 of the sleeve 162b is detached from the lower portion 190 of the sleeve 162b by actuation of the detaching element 194.

In the intact sleeve 162b, the skirt portion 198 of the lower portion 190 of the sleeve 162b comprises an upper peripheral edge congruent with the detaching element 194 which is connected to a lower peripheral edge, also congruent with the detaching element 194, of the upper portion 188 of the sleeve 162b. In FIGS. 17 and 18, the upper peripheral edge of the skirt portion 198 of the lower portion 190 of the sleeve 162b is congruent with a series of alternating diagonally-oriented lines of perforations which together form a zig-zag and comprise the detaching element 194. The upper portion 188 of the sleeve 162b may also have an additional detaching element 200 indicated as a plurality of vertical perforations for facilitating removal of the upper portion 188 of the sleeve 162b and which are disposed more or less vertically therein extending between the detaching element 194 of the sleeve 162b and the upper end 166b of the sleeve 162b.

The upper portion 188 of the sleeve 162b is thereby separable from the lower portion 190 of the sleeve 162b by tearing the upper portion 188 along both the detaching element 200 and the detaching element 194, thereby separating the upper portion 188 from the lower portion 190 of the sleeve 162b. The lower portion 190 of the sleeve 162b remains disposed as the base portion 196 about the flower pot 187 and as the skirt portion 198 about a portion of the plant 192, thereby forming a decorative cover 202, as shown in FIG. 19, which substantially surrounds and encompasses the flower pot 187 and the plant 192 contained therein. An outer peripheral surface 164b of the lower portion 190 of the sleeve 162b, for example, the base and skirt portions 196 and 198, may be modified to provide the lower portion 190 of the sleeve 162b with a paper-like appearance, while the upper portion 188 of the sleeve 162b is left unmodified or is printed with a design. When the upper portion 188 of the sleeve 162b is detached, the lower portion 190 of the sleeve 162b remains about the flower pot 187 and thereby forms the decorative cover 202 about the flower pot 187 which has the appearance of paper.

"Detaching element" as used herein means any element, or combination of elements, or features, such as, but not by way of limitation, perforations, tear strips, zippers, and any other devices or elements of this nature known in the art, or any combination thereof. Therefore, while perforations are shown and described in detail herein, it will be understood that tear strips, zippers, or any other "detaching elements" known in the art, or any combination thereof, could be substituted therefor and/or used therewith.

In a general method of use of the sleeve 162b as the decorative cover 202 for the flower pot 187, an operator provides the sleeve 162b and the flower pot 187 having the plant 192 disposed in a growing medium 203 contained within the flower pot 187. The operator then disposes the flower pot 187 having the plant 192 and the growing medium 203 contained therein into the sleeve 162b by opening the sleeve 162b at the upper end 166b thereof and assuring both that the opening 170b therein is in an open condition, and that the inner peripheral surface 172b of the sleeve 162b is somewhat expanded outward as well, as shown in FIG. 18. The operator then manually or automatically disposes the flower pot 187 into the opening 170b in the sleeve 162b, the flower pot 187 being disposed generally through the upper portion 188 of the sleeve 162b into generally the lower portion 190 of the sleeve 162b, the flower pot 187 remaining in the lower portion 190 of the sleeve 162b, permitting the sleeve 162b to substantially surround and encompass the flower pot 187. It will be understood that alternatively, the sleeve 162 may be provided with an extension (not shown), and the sleeve 162b may be disposed on rods or wickets, and the flower pot 187 may then be disposed in the sleeve 162b either before or after the sleeve 162b has been removed from the wickets.

Embodiments of FIGS. 20A–20C

Referring now to FIG. 20A, designated generally by the reference numeral 210 is a polymeric ribbon material having a paper-like appearance for forming decorative bows and for wrapping items. That is, at least one surface of a web of polymeric material (not shown) is modified to provide a matte or textured finish 212 assimilating the appearance of paper. The modification of the web of polymeric material (not shown) to provide the polymeric ribbon material 210 with a matte or textured finish 212 simulating the texture or appearance of paper can be accomplished in several ways. For example, the polymeric ribbon material 210 having the matte or textured finish 212 can be produced by printing a web of polymeric material with a matted (i.e. dull finish) ink, by lacquering at least one surface of the sheet of polymeric material with a dull finish lacquer or a matting lacquer, by embossing the sheet of polymeric material to provide an embossed pattern assimilating the texture and appearance of paper, or by flocking the sheet of polymeric material, or by application of a foamable lacquer or foamable ink to the sheet of polymeric material, or by embossing and printing the sheet of polymeric material to provide embossed and printed patterns wherein the embossed and printed patterns may be in registry, out of registry or wherein a portion of the embossed and printed patterns are in registry and a portion of the embossed and printed patterns are out of registry. In addition, the matte or textured finish 212 capable of providing the sheet of polymeric material with a paper-like appearance can be achieved by extruding a polymeric resin onto a matted or textured chill roll. Thereafter, the web of material having a paper-like appearance can be cut in a conventional manner to provide the polymeric ribbon material 210 having a paper-like appearance.

Any polymeric material capable of being textured or otherwise modified to provide the polymeric material with a paper-like appearance can be employed in the formulation of the polymeric ribbon material 210. For example, the polymeric material employed to produce the polymeric ribbon material 210 can be the polymeric material 10 (FIG. 1), i.e. a polypropylene film having a thickness of from about 0.1 mil to about 30 mil, and more desirably of from about 0.5 mil to about 10 mil, or the sheet of flexible material 112, i.e., an expanded core polymeric film having a thickness of from about 0.5 mil to about 10 mil.

Referring now to FIG. 20B, designated generally by the reference numeral 220 is another embodiment of a polymeric ribbon material for forming decorative bows and for wrapping items. The polymeric ribbon material 220 is a laminated material comprising a first web or sheet of material 222 having a thickness of from about 0.5 mil to about 10 mil, and more desirably from about 0.6 mil to about 1.25 mil, and a second web or sheet of material 224 having a thickness of from about 0.5 mil to about 10 mil, and more desirably from about 0.6 mil to about 1.25 mil. The laminated material having a paper-like appearance can be produced by laminating two or more sheets of polymeric film (such as two or more sheets of polypropylene film or a sheet of polypropylene film and a sheet of expanded core polymeric film, such as expanded core polypropylene film), or by laminating a polymeric film (such as polypropylene film or an expanded core polymeric film) with a sheet of metallized foil and the like wherein at least one surface of the laminated material is textured or modified to assimilate the texture and appearance of paper. The second web or sheet of material 224 is desirably laminated to the first web or sheet of material 222 with a colored adhesive so as to impart a desired color to the polymeric ribbon material 220. If desired the polymeric ribbon material 220 may be treated or otherwise processed to provide the polymeric ribbon material 220 with a matte or textured finish 226 assimilating the texture and appearance of paper so that the polymeric ribbon material 220 has a paper-like appearance similar to the polymeric ribbon material 210 hereinbefore described with reference to FIG. 20A. That is, the matte or textured finish 226 assimilating paper in appearance can be printed on the first web or sheet of material 222 and thereafter the second web or sheet of material 224 (which in this case is desirably a matte material of translucent polymeric film) is laminated to the first web or sheet of material 222 to provide the polymeric ribbon material with a paper-like appearance. To further enhance the paper-like appearance of the polymeric ribbon material 220, the second web or sheet of material 224 may or may not have a plurality of spatially disposed holes extending therethrough. The matte or textured finish 226 can be produced by printing at least one of the first and second webs or sheets of material 222 and 224 with a matted (i.e. dull finish) ink, by lacquering at least one surface of at least one of the first and second webs or sheets of material 222 and 224 with a dull finish lacquer or a matting lacquer, by flocking at least one of the first and second webs or sheets of material 222 and 224, by application of a foamable lacquer or foamable ink to at least one of the first and second webs or sheets of material 222 and 224, by embossing at least one of the first and second webs or sheets of material 222 and 224 to provide an embossed pattern assimilating the appearance of paper, or by embossing and printing at least one of the first and second webs or sheets of material 222 and 224 to provide embossed and printed patterns wherein the embossed and printed patterns may be in registry, out of registry or wherein a portion of the embossed and printed patterns are in registry and a portion of the embossed and printed patterns are out of registry. In addition, the matte or textured finish 226 capable a providing the polymeric ribbon material 220 with a paper-like appearance can be achieved by extruding the resin used to produce one of the first and second webs or sheets of material 222 and 224 onto a matted or textured chill roll.

Referring now to FIG. 20C, designated generally by the reference numeral 230 is another embodiment of a polymeric ribbon material for forming decorative bows and for wrapping items. The polymeric ribbon material 230 comprises a polymeric film 232 having an upper surface 234, a lower surface 236 and a thickness in the range of from about 0.1 mil to about 30 mil, and more desirably, from about 0.5 mil to about 10 mil. An acrylic heat sealable lacquer 238 can be applied to at least one of the upper and lower surfaces 234 and 236 of the polymeric film 232, such as the lower surface 236 of the polymeric film 232, and the upper surface 234 of the polymeric film 232 is desirably modified to provide the polymeric ribbon material 230 with a matte or textured finish 239 assimilating the appearance of paper. The modification of the polymeric film 232 to provide the polymeric ribbon material 230 with a paper-like appearance can be accomplished in several ways. For example, the polymeric ribbon material 230 having the matte or textured finish 239 can be produced by printing the polymeric film 232 with a matted (i.e. dull finish) ink, by lacquering at least one of the upper and lower surfaces 234 and 236 of the polymeric film 232 with a dull finish lacquer or a matting lacquer, by flocking the polymeric film 232, by application of a foamable lacquer or foamable ink to the polymeric film 232, by embossing the polymeric film 232 to provide an embossed pattern assimilating paper in appearance, or by embossing and printing the polymeric film 232 to provide embossed and printed patterns wherein the embossed and printed patterns may be in registry, out of registry or wherein a portion of the embossed and printed patterns are in registry and a portion of the embossed and printed patterns are out of registry. In addition, the matte or textured finish 239 capable of providing the polymeric film 232 with a paper-like appearance can be achieved by extruding a polymeric resin onto a matted or textured chill roll. Thereafter, the polymeric film 232 having a paper-like appearance can be cut in a conventional manner to provide the polymeric ribbon material 230.

Any polymeric film capable of being textured or otherwise modified to provide the polymeric film 232 with a paper-like appearance can be employed in the formulation of the polymeric ribbon material 230. For example, the polymeric film 232 employed to produce the polymeric ribbon material 230 can be polypropylene film having a thickness of from about 0.1 mil to about 30 mil, and more desirably of from about 0.5 mil to about 10 mil, or an expanded core polymeric film having a thickness of from about 0.6 mil to about 10 mil.

Embodiments of FIGS. 21–22B

Referring now to FIG. 21, designated generally by the reference numeral 240 is a system for producing decorative grass 242 having a paper-like appearance in accordance with the present invention. That is, at least one surface of a sheet or web of polymeric material is modified with a matte or textured finish to provide a web of polymeric material 244 having a paper-like appearance (i.e. assimilates paper in appearance) as hereinbefore described. Thus, the decorative grass 242 produced from the web of polymeric material 244 having a paper-like appearance will also have a matte or textured finish 246 (FIGS. 22A) which provides the decorative grass 242 with paper-like appearance.

Any polymeric material capable of being textured or otherwise modified to provide the polymeric material 244 with a paper-like appearance can be employed to produce the decorative grass 242 having a paper-like appearance. For example, the polymeric material employed to produce the web of polymeric material 244 having a paper-like appearance can be polypropylene film having a thickness of from about 0.1 mil to about 30 mil, and more desirably of from about 0.5 mil to about 10 mil, or an expanded core polymeric film having a thickness of from about 0.5 mil to about 10 mil, or laminates having a thickness of from about 1 mil to about 20 mil. The laminates which can be used to produce the web of polymeric material 244 having a paper-like appearance can be formed by laminating two or more webs of polymeric film (such as two or more webs of polypropylene film or a web of polypropylene film and a web of expanded core polymeric film, such as expanded core polypropylene film), or by laminating a polymeric film (such as polypropylene film or an expanded core polymeric film such as expanded core polypropylene film) with metallized foil and the like. The only requirement in using a laminate to produce the web of polymeric material 244 having a paper-like appearance is that at least one surface of the laminate be capable of being modified to provide the laminate with at least one surface having a paper-like appearance.

The modification of the web of polymeric material 244 to provide the matte or textured finish 246 can be accomplished in several ways. For example, the web of polymeric material 244 having the matte or textured finish 246 which provides the web of polymeric material 244 with the paper-like appearance can be produced by printing the web of polymeric material 244 with a matted (i.e. dull finish) ink, by lacquering at least one surface of the web of polymeric material 244 with a dull finish lacquer or a matting lacquer, by embossing the web of polymeric material 244 to provide an embossed polymeric material having the appearance of paper, or by flocking the web of polymeric material 244, or by application of a foamable lacquer or foamable ink to the web of polymeric material 244, or by embossing and printing the web of polymeric material 244 to provide embossed and printed patterns wherein the embossed and printed patterns may be in registry, out of registry or wherein a portion of the embossed and printed patterns are in registry and a portion of the embossed and printed patterns are out of registry. In addition, the matte or textured finish 246 capable of providing the web of polymeric material 244 with a paper-like appearance can be achieved by extruding a polymeric resin onto a matted or textured chill roll.

Referring again to FIG. 21, a roll 248 of the web of polymeric material 244 having the matte or textured finish 246 simulating the texture or appearance of paper is supported on a mandrel 250 having a brake assembly 252 operably connected thereto so that the web of polymeric material 244 having the matte or textured finish 246 simulating the texture or appearance of paper can be controllably withdrawn from the roll 248. The web of polymeric material 244 having the matte or textured finish 246 simulating the texture or appearance of paper is passed through a pair of tension or nip rollers 254 and 256 and into a slitter or shredder unit 258 where the web of polymeric material 244 having the matte or textured finish 246 is slit to provide a slit web of polymeric material 260 having a plurality of strips of predetermined width. The slitting of the web of polymeric material 244 having the matte or textured finish 246 to produce the slit web of polymeric material 244 having a plurality of strips of predetermined width can be accomplished using any well known method and device. Such common methods of slitting the web of polymeric material 244 having the matte or textured finish 246 include: (a) slitting the web of polymeric material 244 having the matte or textured finish 246 assimilating the appearance of paper to produce side-by-side strips of material wherein the longer dimension of the strips is in the direction of travel of the web of polymeric material 244 having the matte or textured finish 246, i.e. the machine direction; or (b) slitting the web of polymeric material 244 having the matte or textured finish 246 so that the longer dimension of the strips of material are oblique to the direction of travel of the web of polymeric material 244 having the matte or textured finish 246, i.e. obliquely to the machine direction.

The slit web of polymeric material 260 having a plurality of strips of predetermined width is then passed through a cutting unit 262 where the strips of the slit web of polymeric material 260 are cut into segments to form the decorative grass 242 having at least one matted or textured surface 246 which provides the decorative grass 242 with a paper-like appearance. A segment 264 of the decorative grass 242 having at least one matted or textured surface 246 which provides the decorative grass 242 with a paper-like appearance is illustrated in FIG. 22A.

Any conventional device and method can be employed as the slitter or shredder unit 258 for slitting the web of polymeric material 244 to produce the slit web of polymeric material 260 having a plurality of strips of predetermined width and as the cutting unit 262 for cutting the strips of the slit web of polymeric material 260 to form the decorative grass 242 having a paper-like appearance. Examples of conventional devices which can be used as the slitter or shredder unit 258 and/or as the cutting unit 262 are rotary knives, reciprocating knives, die cutting, laser cutting, water jet cutting, air jet cutting and the like.

The decorative grass 242 having a paper-like appearance produced by cutting the strips of the slit web of polymeric material 260 can then be conveyed to a storage area (not shown) which may be in the form of a suitable bin, or the decorative grass 242 having a paper-like appearance may be conveyed to a packaging machine, or conveyed to a baling machine for baling prior to storage. As other alternatives, the decorative grass 242 having a paper-like appearance may be placed into boxes or cartons, subjected to further processing immediately or held for subsequent processing.

Referring now to FIG. 22B, designated generally by the reference numeral 266, is a segment of a decorative grass 268 having a paper-like appearance produced from the sheet of flexible laminated material 112a having a paper-like appearance hereinbefore described with reference to FIG. 9B, except that both the upper and lower surfaces of the sheet of flexible laminated material 112a are provided with a matted or textured finish 270 simulating the texture or appearance of paper so that the decorative grass 268 is also provided with the matte or textured finish 270 simulating the texture or appearance of paper on an upper surface 272 and lower surface 274 of the segments of the decorative grass 268, such as the segment 266 illustrated in FIG. 22B. However, it should be understood that the decorative grass 268 having a paper-like appearance can be produced from any laminated material where at least one surface of the laminated material is modified, such as by matting or texturing, to provide the laminated material with an appearance assimilating paper.

The decorative grasses having a paper-like appearance prepared in accordance with the present invention, such as the decorative grass 242 (FIG. 22A) and the decorative grass 268 (FIG. 22B) can also be provided with various types of curl configurations, can be crimped or otherwise modified. That is, in addition to providing the webs of material from which the decorative grasses are produced with a matted or textured surface which assimilates paper in appearance, various types of curls, crimps and combinations thereof can be imparted to the webs of material prior to slitting the webs of material to produce slit webs of material, or to the slit web of material prior to cutting the slit webs of material to produce the decorative grasses having a paper-like appearance. Any method or apparatus capable of imparting the desired curl and/or crimp to the webs of material so that the decorative grasses produced from such webs of material possess both a curl and/or crimped configuration and a paper-like appearance can be employed to impart a curl and/or crimp to the webs of material. Examples of various methods and apparatus which may be used to impart curl configurations to the webs of material employed to produce decorative grasses having a paper-like appearance as well as a cure configuration are described in co-pending U.S. patent application U.S. Ser. No. 09/586,901, entitled "Method and Apparatus For Making Curled Decorative Grass" which is hereby expressly incorporated herein by reference.

Crimping machines capable of imparting the desired crimp to the webs of material so that the decorative grasses produced from such webs of material possess a crimped configuration, as well as having a paper-like appearance, are well known and commercially available. One method for imparting a crimp configuration to the webs of material so that the decorative grasses produced from such webs of material possess a crimped configuration, as well as having a paper-like appearance, is disclosed in co-pending U.S. patent application U.S. Pat. No. 5,891,286, entitled "Method Of Forming Curled Or Crimped Decorative Elements Having An Optical Effect" issued to Weder on Apr. 6, 1999, which is hereby expressly incorporated herein by reference.

Changes may be made in the construction and the operation of the various components, elements and assemblies described herein or in the steps or the sequence of steps of the methods described herein without departing from the spirit and scope of the invention as defined in the following claims.

What is claimed:

1. A decorative preformed flower pot cover having a texture or appearance simulating the texture or appearance of paper on at least a portion of one surface thereof, the decorative preformed flower pot cover comprising:

a base having a closed lower end, an open upper end and a retaining space, the base of the decorative preformed flower pot cover having a plurality of overlapping folds of which at least a portion are permanently connected;

a decorative border extending outwardly from the open upper end of the base; and wherein the decorative preformed flower pot cover is formed of a sheet of flexible laminated material, the sheet of flexible laminated material comprising:

at least one sheet of polymeric film;

at least one sheet of material laminated to the at least one sheet of polymeric film, the at least one sheet of material selected from the group consisting of a polymeric film, metallized foil and combinations thereof; and wherein at least a portion of one surface of the sheet of flexible laminated material is printed so as to provide a texture or appearance simulating the texture or appearance of paper so that at least a portion of one surface of the decorative preformed flower pot cover formed therefrom is provided with a texture or appearance simulating the texture or appearance of paper.

2. The decorative preformed flower pot cover of claim 1 wherein the at least one sheet of polymeric film laminated to the at least one sheet of material has a thickness of from about 0.5 mil to about 10 mil and the at least one sheet of material has a thickness in the range of from about 0.5 mil to about 10 mil.

3. The decorative preformed flower pot cover of claim 2 wherein the at least one sheet of polymeric film is laminated to the at least one sheet of material with a colored adhesive.

4. The decorative preformed flower pot cover of claim 2 wherein the at least one sheet of polymeric film is a sheet of an expanded core polymeric film or polypropylene film.

5. The decorative preformed flower pot cover of claim 4 wherein the at least one sheet of polymeric film is a sheet of expanded core polypropylene film.

6. The decorative preformed flower pot cover of claim 1 wherein a substantial portion of the overlapping folds in the base of the decorative preformed flower pot cover extend over different distances and at various and arbitrary angles.

7. The decorative preformed flower pot cover of claim 1 wherein the decorative border of the decorative preformed flower pot cover is substantially free of permanently connected overlapping folds.

8. The decorative preformed flower pot cover of claim 1 wherein the at least one sheet of polymeric film laminated to the at least one sheet of material has a thickness of from about 0.5 mil to about 10 mil and the at least one sheet of material has a thickness in the range of from about 0.5 mil to about 10 mil, and wherein a substantial portion of the overlapping folds formed in the base of the decorative preformed flower pot cover extend over different distances and at various and arbitrary angles, and wherein the decorative border of the decorative preformed flower pot cover is substantially free of permanently connected overlapping folds.

9. The decorative preformed flower pot cover of claim 1 wherein at least one of the at least one sheet of polymeric film and the at least one sheet of material is further provided with printed patterns, embossed patterns, and combinations thereof in addition to the texture or appearance simulating the texture or appearance of paper.

10. The decorative preformed flower pot cover of claim 9 wherein at least one of the at least one sheet of polymeric film and the at least one sheet of material of the sheet of flexible laminated material is further provided with printed and embossed patterns, and wherein the printed pattern is in register with the embossed pattern.

11. The decorative preformed flower pot cover of claim 9 wherein at least one of the at least one sheet of polymeric film and the at least one sheet of material of the sheet of flexible laminated material is further provided with printed and embossed patterns, and wherein the printed pattern is out of register with the embossed pattern.

12. The decorative preformed flower pot cover of claim 9 wherein at least one of the at least one sheet of polymeric film and the at least one sheet of material of the sheet of flexible laminated material is further provided with printed and embossed patterns, and wherein a portion of the printed pattern is in register with the embossed pattern and a portion of the printed pattern is out of register with the embossed pattern.

13. The decorative preformed flower pot cover of claim 1 wherein at least a portion of one surface of one of the at least one sheet of polymeric film and the at least one sheet of material laminated thereto is provided with an embossed pattern which cooperates with the printed pattern to provide the appearance or texture simulating the appearance or texture of paper.

14. The decorative preformed flower pot cover of claim 13 wherein the the at least one sheet of polymeric film and the at least one sheet of material are laminated with a colored adhesive.

15. A decorative preformed flower pot cover having a texture or appearance simulating the texture or appearance of paper on at least a portion of one surface thereof, the decorative preformed flower pot cover comprising:

a base having a closed lower end, an open upper end and a retaining space, the base of the decorative preformed flower pot cover having a plurality of overlapping folds of which at least a portion are permanently connected;

a decorative border extending outwardly from the open upper end of the base; and wherein the decorative preformed flower pot cover is formed of at least one sheet of flexible material having a texture or appearance simulating the texture or appearance of paper on at least a portion of one surface thereof so that at least a portion of one surface of the decorative preformed flower pot cover formed therefrom is provided with a texture or appearance simulating the texture or appearance of paper, and wherein the at least one sheet of flexible material comprises:

an expanded core polymeric film having a thickness in the range of from about 0.6 mil to about 10 mil, the expanded core polymeric film having an upper surface and a lower surface wherein at least a portion of one of the upper surface and the lower surface of the expanded core polymeric film is printed to provide a texture or appearance simulating the texture or appearance of paper; and a lacquer disposed on at least a portion of one of the upper and lower surfaces of the expanded core polymeric film.

16. The decorative preformed flower pot cover of claim 1 wherein the sheet of flexible laminated material is printed with a matted ink to provide the texture or appearance simulating the texture or appearance of paper.

17. The decorative preformed flower pot cover of claim 1 wherein the sheet of flexible laminated material is printed with a foamable ink to provide the texture or appearance simulating the texture or appearance of paper.

18. The decorative preformed flower pot cover of claim 13 wherein the printed pattern is in register with the embossed pattern.

19. The decorative preformed flower pot cover of claim 13 wherein the printed pattern is out of register with the embossed pattern.

20. The decorative preformed flower pot cover of claim 13 wherein a portion of the printed pattern is in register with the embossed pattern and a portion of the printed pattern is out of register with the embossed pattern.

21. The decorative preformed flower pot cover of claim 15 wherein the lacquer is an acrylic heat sealable lacquer.

22. The decorative preformed flower pot cover of claim 15 wherein the lacquer is a matting lacquer which cooperates with the printing on the expanded core polymeric film to provide the texture or appearance simulating the texture or appearance of paper.

23. The decorative preformed flower pot cover of claim 15 wherein the lacquer is a foamable lacquer which cooperates with the printing on the expanded core polymeric film to provide the texture or appearance simulating the texture or appearance of paper.

24. A decorative preformed flower pot cover having a texture or appearance simulating the texture or appearance of paper on at least a portion of one surface thereof, the decorative preformed flower pot cover comprising:
- a base having a closed lower end, an open upper end and a retaining space, the base of the decorative preformed flower pot cover having a plurality of overlapping folds of which at least a portion are permanently connected;
- a decorative border extending outwardly from the open upper end of the base; and
- wherein the decorative preformed flower pot cover is formed of a sheet of flexible laminated material, the sheet of flexible laminated material comprising:
  - at least one sheet of polymeric film;
  - at least one sheet of material laminated to the at least one sheet of polymeric film, the at least one sheet of material selected from the group consisting of a polymeric film, metallized foil and combinations thereof; and
  - wherein at least a portion of one surface of the sheet of flexible laminated material is embossed so as to provide a texture or appearance simulating the texture or appearance of paper so that at least a portion of one surface of the decorative preformed flower pot cover formed therefrom is provided with a texture or appearance simulating the texture or appearance of paper.

25. The decorative preformed flower pot cover of claim 24 wherein the at least one sheet of polymeric film laminated to the at least one sheet of material has a thickness of from about 0.5 mil to about 10 mil and the at least one sheet of material has a thickness in the range of from about 0.5 mil to about 10 mil.

26. The decorative preformed flower pot cover of claim 25 wherein the at least one sheet of polymeric film is laminated to the at least one sheet of material with a colored adhesive.

27. The decorative preformed flower pot cover of claim 25 wherein the at least one sheet of polymeric film is a sheet of expanded core polymeric film or polypropylene film.

28. The decorative preformed flower pot cover of claim 24 wherein a substantial portion of the overlapping folds in the base of the decorative preformed flower pot cover extend over different distances and at various and arbitrary angles.

29. The decorative preformed flower pot cover of claim 24 wherein the decorative border of the decorative preformed flower pot cover is substantially free of permanently connected overlapping folds.

30. The decorative preformed flower pot cover of claim 27 wherein at least one of the at least one sheet of polymeric film and the at least one sheet of material is further provided with printed patterns, embossed patterns, and combinations thereof in addition to the texture or appearance simulating the texture or appearance of paper.

31. The decorative preformed flower pot cover of claim 30 wherein at least one of the at least one sheet of polymeric film and the at least one sheet of material of the sheet of flexible laminated material is further provided with printed and embossed patterns, and wherein the printed pattern is in register with the embossed pattern.

32. The decorative preformed flower pot cover of claim 30 wherein at least one of the at least one sheet of polymeric film and the at least one sheet of material of the sheet of flexible laminated material is further provided with printed and embossed patterns, and wherein the printed pattern is out of register with the embossed pattern.

33. The decorative preformed flower pot cover of claim 30 wherein at least one of the at least one sheet of polymeric film and the at least one sheet of material of the sheet of flexible laminated material is further provided with printed and embossed patterns, and wherein a portion of the printed pattern is in register with the embossed pattern and a portion of the printed pattern is out of register with the embossed pattern.

34. A decorative preformed flower pot cover having a texture or appearance simulating the texture or appearance of paper on at least a portion of one surface thereof, the decorative preformed flower pot cover comprising:
- a base having a closed lower end, an open upper end and a retaining space, the base of the decorative preformed flower pot cover having a plurality of overlapping folds of which at least a portion are permanently connected;
- a decorative border extending outwardly from the open upper end of the base; and
- wherein the decorative preformed flower pot cover is formed of at least one sheet of flexible material having a texture or appearance simulating the texture or appearance of paper on at least a portion of one surface thereof so that at least a portion of one surface of the decorative preformed flower pot cover formed therefrom is provided with a texture or appearance simulating the texture or appearance of paper, and wherein the at least one sheet of flexible material comprises:
  - an expanded core polymeric film having a thickness in the range of from about 0.6 mil to about 10 mil, the expanded core polymeric film having an upper surface and a lower surface; and
  - a lacquer disposed on at least a portion of one of the upper and lower surfaces of the expanded core polymeric film, the lacquer providing a texture or appearance simulating the texture or appearance of paper to the sheet of flexible material.

35. The decorative preformed flower pot cover of claim 34 wherein the lacquer is a foamable lacquer.

36. The decorative preformed flower pot cover of claim 34 wherein the lacquer is a matting lacquer.

37. A decorative preformed flower pot cover having a texture or appearance simulating the texture or appearance of paper on at least a portion of one surface thereof, the decorative preformed flower pot cover comprising:
- a base having a closed lower end, an open upper end and a retaining space, the base of the decorative preformed flower pot cover having a plurality of overlapping folds of which at least a portion are permanently connected;
- a decorative border extending outwardly from the open upper end of the base; and
- wherein the decorative preformed flower pot cover is formed of at least one sheet of flexible material having a texture or appearance simulating the texture or appearance of paper on at least a portion of one surface thereof so that at least a portion of one surface of the decorative preformed flower pot cover formed therefrom is provided with a texture or appearance simulating the texture or appearance of paper, and wherein the at least one sheet of flexible material comprises:
  - an expanded core polymeric film having a thickness in the range of from about 0.6 mil to about 10 mil, the expanded core polymeric film having an upper surface and a lower surface wherein at least a portion of one of the upper surface and the lower surface of the expanded core polymeric film is embossed to provide a texture or appearance simulating the texture or appearance of paper; and a lacquer disposed on at least a portion of one of the upper and lower surfaces of the expanded core polymeric film.

38. The decorative preformed flower pot cover of claim 37 wherein the lacquer is an acrylic heat sealable lacquer.

39. The decorative preformed flower pot cover of claim 37 wherein the acquer is a matting lacquer which cooperates with the embossing on the expanded core polymeric film to provide the texture or appearance simulating the texture or appearance of paper.

40. The decorative preformed flower pot cover of claim 37 wherein the lacquer is a foamable lacquer which cooperates with the embossing on the expanded core polymeric film to provide the texture or appearance simulating the texture or appearance of paper.

* * * * *

UNITED STATES PATENT AND TRADEMARK OFFICE
CERTIFICATE OF CORRECTION

PATENT NO. : 6,403,207 B1
DATED : June 11, 2002
INVENTOR(S) : Donald E. Weder

It is certified that error appears in the above-identified patent and that said Letters Patent is hereby corrected as shown below:

Title page,
Item [54], Title, should read -- PREFORMED FLOWER POT COVER HAVING AN APPEARANCE OR TEXTURE SIMULATING THE APPEARANCE OR TEXTURE OF PAPER --.

Column 25,
Line 53, change the number "27" to the number -- 24 --.

Column 27,
Line 10, after the word "the" and before the word "is" change the word "acquer" to -- lacquer --.

Signed and Sealed this

Twenty-seventh Day of April, 2004

JON W. DUDAS
*Acting Director of the United States Patent and Trademark Office*